United States Patent
Okumura

(10) Patent No.: US 7,907,239 B2
(45) Date of Patent: *Mar. 15, 2011

(54) LIQUID CRYSTAL DEVICE AND ELECTRONIC APPARATUS

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 926 days.

This patent is subject to a terminal disclaimer.

(21) Appl. No.: 11/797,746

(22) Filed: May 7, 2007

(65) Prior Publication Data

US 2008/0151157 A1 Jun. 26, 2008

Related U.S. Application Data

(63) Continuation of application No. 10/889,250, filed on Jul. 13, 2004, now Pat. No. 7,242,448.

(30) Foreign Application Priority Data

Jul. 30, 2003 (JP) .................................. 2003-282775

(51) Int. Cl.
*G02F 1/1335* (2006.01)
(52) U.S. Cl. ........................................................ 349/114
(58) Field of Classification Search .................... 349/114
See application file for complete search history.

(56) References Cited

U.S. PATENT DOCUMENTS

| | | | |
|---|---|---|---|
| 6,788,375 B2 * | 9/2004 | Ogishima et al. | 349/130 |
| 6,819,379 B2 | 11/2004 | Kubo et al. | |
| 6,862,062 B2 | 3/2005 | Kubo et al. | |
| 6,967,702 B2 | 11/2005 | Ishii et al. | |
| 7,242,448 B2 * | 7/2007 | Okumura | 349/114 |
| 7,307,681 B2 | 12/2007 | Okumura | |
| 2001/0024257 A1 | 9/2001 | Kubo et al. | |
| 2002/0075436 A1 | 6/2002 | Kubo et al. | |
| 2002/0080320 A1 | 6/2002 | Suzuki et al. | |
| 2002/0149728 A1 | 10/2002 | Ogishima et al. | |
| 2003/0016324 A1 | 1/2003 | Jisaki et al. | |

FOREIGN PATENT DOCUMENTS

EP 1 484 633 A1 8/2004

(Continued)

OTHER PUBLICATIONS

Jisaki et al., Makoto, "Development of transflective LCD for high contrast and wide viewing angle by using homeotropic alignment," Asia Display/IDW, pp. 133-136, 2001.

(Continued)

*Primary Examiner* — James A Dudek
(74) *Attorney, Agent, or Firm* — Oliff & Berridge PLC

(57) ABSTRACT

Aspects of the invention provide a transflective liquid crystal display device that prevents display failure, such as an after-image and unevenness like stains, and achieves a bright display with a wide viewing angle in both transmissive display and reflective display. The liquid crystal display device of the invention is a vertically-aligned transflective liquid crystal display device having a multigap structure. Each pixel can include, in a dot region, a plurality of islands, and connecting portions for electrically connecting the adjoining islands. Two islands, of the islands, can be disposed in a transmissive display region, and the remaining island is disposed in a reflective display region. A boundary sloping area in which the thickness of a liquid crystal layer continuously changes is disposed right below the connecting portion in the pixel electrode.

13 Claims, 11 Drawing Sheets

FOREIGN PATENT DOCUMENTS

| | | |
|---|---|---|
| JP | A 11-242226 | 9/1999 |
| JP | A 2000-305099 | 11/2000 |
| JP | A 2002-202511 | 7/2002 |
| JP | A 2002-287158 | 10/2002 |
| JP | A 2002-350853 | 12/2002 |
| JP | A 2000-167253 | 6/2003 |
| JP | A 2004-069769 | 3/2004 |

OTHER PUBLICATIONS

Anonymous, "Liquid Crystal Display," Research Disclosure, Kenneth Mason Publications, Hampshire, GB, vol. 41, No. 409, May 1, 1998.

May 28, 2010 Office Action for U.S. Appl. No. 11/889,483.

* cited by examiner

REFLECTIVE DISPLAY REGION R

TRANSMISSIVE DISPLAY REGION T

REFLECTIVE DISPLAY REGION R

TRANSMISSIVE DISPLAY REGION T

REFLECTIVE DISPLAY REGION R
TRANSMISSIVE DISPLAY REGION T

REFLECTIVE DISPLAY REGION R
TRANSMISSIVE DISPLAY REGION T

F I G. 7
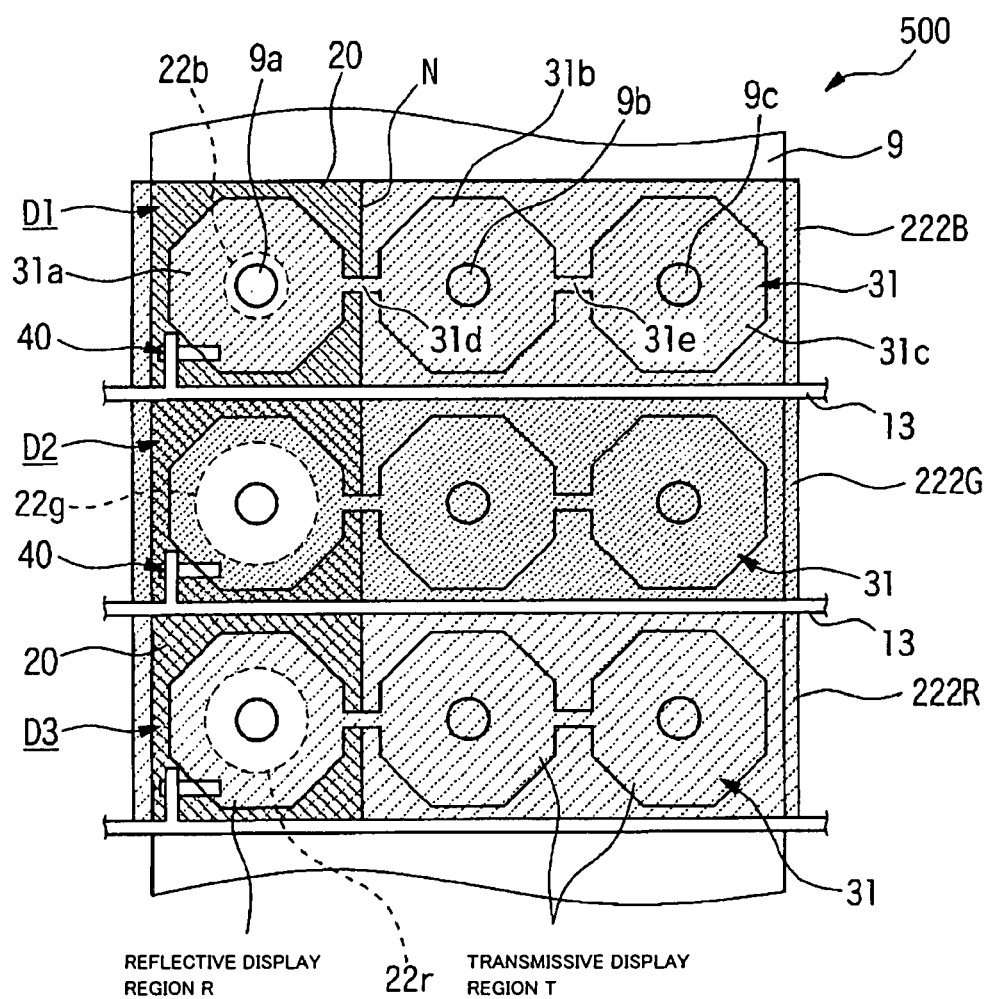

REFLECTIVE DISPLAY REGION R

TRANSMISSIVE DISPLAY REGION T

REFLECTIVE DISPLAY
REGION R

TRANSMISSIVE DISPLAY
REGION T

F I G. 10
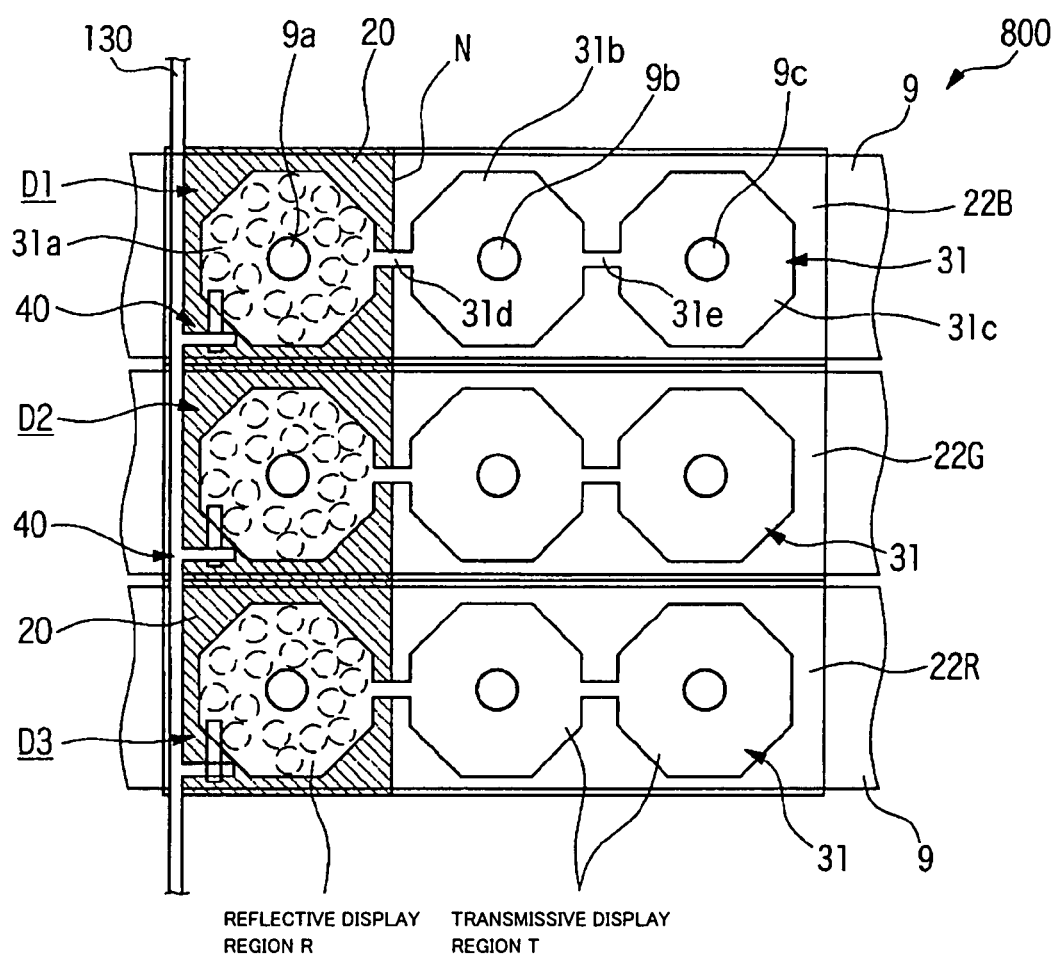
REFLECTIVE DISPLAY REGION R
TRANSMISSIVE DISPLAY REGION T

LIQUID CRYSTAL DEVICE AND ELECTRONIC APPARATUS This is a Continuation of application Ser. No. 10/889,250 filed Jul. 13, 2004. The entire disclosure of the prior application is hereby incorporated by reference herein in its entirety.

BACKGROUND OF THE INVENTION

1. Field of Invention

The present invention relates to a liquid crystal display device and an electronic apparatus.

2. Description of Related Art

Some related art transflective liquid crystal display devices utilize external light in bright places, in a manner similar to that in reflective liquid crystal display devices, and make the display visible with a backlight in dark places, in a manner similar to that in transmissive liquid crystal display devices. Such related art transflective liquid crystal display devices include a liquid crystal layer disposed between an upper substrate and a lower substrate, and a reflective film formed of a metal film made of aluminum or the like having a light-transmitting window provided on the inner side of the lower substrate. The reflective film functions as a semi-transmissive reflector. In this case, in a reflection mode, external light incident from the upper substrate passes through the liquid crystal layer, is reflected by the reflective film on the inner side of the lower substrate, passes through the liquid crystal layer again, and is emitted from the upper substrate to contribute to display. In contrast, in a transmission mode, light from a backlight incident from the lower substrate passes through the liquid crystal layer from the window of the reflective film, and is emitted outside from the upper substrate to contribute to display. Therefore, a part of the reflective film in which the window is provided serves as a transmissive display region, and the other part serves as a reflective display region.

In the related art transflective liquid crystal display devices, however, the viewing angle for transmissive display is narrow. This is because reflective display must be performed with one polarizer provided on the side of an observer because of the semi-transmissive reflector on the inner side of the liquid crystal cell so that parallax is not caused, and the flexibility of optical design is therefore low. In order to overcome this problem, Jisaki et al. proposed a new liquid crystal display device using homeotropic liquid crystal in "Development of transflective LCD for high contrast and wide viewing angle by using homeotropic alignment", M. Jisaki et al., Asia Display/IDW'01, pp. 133-136 (2001) and Japanese Unexamined Patent Application Publication No. 2002-350853. The liquid crystal display device has the following three features:

(1) A "VA (Vertical Alignment) mode" in which liquid crystal having a negative dielectric anisotropy is aligned perpendicular to the substrates, and is tilted by the application of a voltage;

(2) A "multigap structure" in which the thickness of a liquid crystal layer (cell gap) is different between a transmissive display region and a reflective display region (as for this structure, see, for example, Japanese Unexamined Patent Application Publication No. 11-242226); and (3) A structure in which the transmissive display region is shaped like a regular octagon, and a protrusion is provided at the center of the transmissive display region on a counter substrate so that the liquid crystal can tilt in all directions in the region, that is, a "multi-domain structure".

SUMMARY OF THE INVENTION

The multigap structure described above is effective in ensuring the same electrooptic characteristics (a transmittance-voltage characteristic and a reflectance-voltage characteristic) in the transmissive display region and the reflective display region. This is because light passes through the liquid crystal layer only once in the transmissive display region, while it passes therethrough twice in the reflective display region.

The multi-domain method adopted by Jisaki et al. is a method utilizing the protrusion and a slope defined by the multigap. However, this method has two serious problems. One problem is a weak alignment control force of the slope in the multigap. In a sloping area in the multigap, liquid crystal molecules are aligned in an oblique direction perpendicular to the inclination of the sloping area, and an electric field is also applied thereto in the direction perpendicular to the inclination. Therefore, a force for tilting the liquid crystal molecules in one direction is reduced. When the distance between the protrusion provided at the center of the transmissive display region and the sloping area in the multigap exceeds a predetermined value, the liquid crystal molecules are not tilted in a predetermined direction when a voltage is applied. Therefore, the transmissive display region must be shaped like a sufficiently small octagon, and the aperture ratio decreases. The other problem is that the tilting direction of liquid crystal in the reflective display region is not controlled sufficiently. Disorderly tilting of the liquid crystal causes disclination on the boundary between different liquid crystal alignment regions, which results in an afterimage and the like. Moreover, since the liquid crystal alignment regions have different viewing-angle characteristics, when the liquid crystal display device is viewed from an oblique direction, unevenness like stains appears.

An object of the invention is to provide a transflective liquid crystal display device that can prevent display failure, such as an afterimage and unevenness like stains, in both transmissive display and reflective display, and that achieves a bright display with a wide viewing angle.

The invention can provide a liquid crystal display device including a pair of substrates each having an electrode on one side, and a liquid crystal layer disposed between the substrates with the electrodes therebetween, the substrates and the liquid crystal layer defining dot regions. Each of the dot regions includes a transmissive display region for transmissive display and a reflective display region for reflective display. The liquid crystal layer contains liquid crystal that is initially aligned in the vertical direction, and the thickness thereof differs between the transmissive display region and the reflective display region. At least one of the electrodes of the substrates can include, in the dot region, a plurality of islands and a connecting portion for electrically connecting the adjoining islands, the islands include an integral number of island disposed in each of the transmissive display region and the reflective display region, and wherein a boundary sloping area provided on the inner sides of the substrates to make the thickness of the liquid crystal layer different between the transmissive display region and the reflective display region is disposed right below the connecting portion of the electrode.

That is, the liquid crystal display device of the invention is a vertically-aligned transflective liquid crystal display device having a multigap structure, and an electrode in a dot region includes a plurality of islands and a connecting portion for electrically connecting the islands.

In such a structure in which the electrode in the dot region includes a plurality of islands, the tilting direction of homeotropic liquid crystal is pointed toward the centers of the islands by oblique electric fields generated at the edges of the islands by the application of a voltage. As a result, liquid crystal domains in a radially aligned state are formed in the planar regions of the islands. A plurality of liquid crystal domains in such a radially aligned state provided in a dot region ensure a uniform viewing-angle characteristic in all directions. Moreover, since the boundaries between the liquid crystal domains are fixed at the boundaries between the adjoining islands, unevenness like stains does not appear when the panel is obliquely viewed, and superior display is possible.

Since an integral number of islands are disposed in each of the reflective display region and the transmissive display region in the invention, the thickness of the liquid crystal layer is uniform in the islands disposed in each region, and a high-quality display in which the liquid crystal alignment state is properly controlled can be ensured in both reflective display and transmissive display.

Since the boundary sloping area (multigap sloping area) provided in the dot region to make the thickness of the liquid crystal layer different in the reflective display region and the transmissive display region is disposed right below the connecting portion for electrically connecting the adjoining islands, the display quality can be effectively prevented from being reduced by the multigap structure. More specifically, since liquid crystal molecules are aligned along the inclination of the boundary sloping area, if the boundary sloping area has an electrode, an oblique electric field is generated when a voltage is applied, and may disturb the alignment of the liquid crystal molecules. Accordingly, the above configuration of the invention can minimize the electrode in the boundary sloping area, and effectively prevents the display quality from being reduced by the boundary sloping area.

In this way, the liquid crystal display device of the invention makes it possible to achieve a high-contrast display with a wide viewing angle in both reflective display and transmissive display, and a high-quality display that does not cause unevenness like stains or the like when the panel is obliquely viewed.

In the liquid crystal display device of the invention, the islands may have almost the same planar shape in the reflective display region and the transmissive display region. Since this allows the liquid crystal domains provided in the dot region to have the same shape and the same size in both the reflective display region and the transmissive display region, the viewing-angle characteristic is uniform in reflective display and transmissive display, and a display with a uniform viewing-angle characteristic can be performed, regardless of a display mode.

In the liquid crystal display device, preferably, alignment control devices are provided in the planar regions of the islands to control the alignment state of the liquid crystal when a voltage is applied. This makes it possible to more properly control the alignment state of the liquid crystal in the planar regions of the islands (that is, in the display regions) by the alignment control effect of the oblique electric fields generated at the edges of the islands and by the alignment control effect of the above alignment control means. Even when the planar areas of the islands are made relatively large, alignment is rarely disturbed, and superior display is possible.

In the liquid crystal display device of the invention, preferably, the alignment control devices can be provided at almost the centers of the planar regions of the islands. In this case, the liquid crystal can be aligned radially and symmetrically with respect to the centers of the islands in the liquid crystal domains provided corresponding to the islands, and the viewing-angle characteristic of the liquid crystal display device can be made symmetric with respect to the front of the panel (in the direction of the normal to the substrates).

In the liquid crystal display device of the invention, the alignment control devices can be provided corresponding to the islands in the dot region, and an alignment control means corresponding to an island disposed in the reflective display region has a planar area smaller than that of an alignment control means disposed in the transmissive display region.

In the liquid crystal display device of the invention having the multigap structure, in the reflective display region in which the thickness of the liquid crystal layer is relatively small, the alignment control effect of an oblique electric field at the edge of the island and the alignment control device is stronger than in the transmissive display region in which the thickness of the liquid crystal layer is large. Accordingly, by setting the planar area of the alignment control device in the reflective display region to be smaller than that of the alignment control device in the transmissive display region, and using the difference in the alignment control effect due to the thickness of the liquid crystal layer, an alignment control effect similar to that in the transmissive display region is obtained, and the aperture ratio is increased by reducing the planar area or the like. Consequently, the brightness can be increased without reducing the reflective display contrast and the like.

In the liquid crystal display device of the invention, the alignment control device may be apertures provided in an electrode opposing the islands with the liquid crystal layer therebetween, or protrusions made of an insulating material and provided on the electrode. In the liquid crystal display device of the invention, these apertures or protrusions can be used as the alignment control device. Whether the apertures or the protrusions are used, the tilting direction of the homeotropic liquid crystal when a voltage is applied can be controlled properly.

In the liquid crystal display device of the invention, preferably, the islands are shaped like a circle or a regular polygon in plan view. In the invention, the islands are provided so that the liquid crystal is radially oriented in the planar regions thereof by oblique electric fields generated at the edges. The above shape makes it possible to easily form liquid crystal domains in the radially oriented state. In order to make the viewing-angle characteristic uniform, it is preferable that the islands be rotationally symmetric with respect to the planar centers thereof, and have a planar shape like a circle or a regular polygon.

In the liquid crystal display device of the invention, preferably, the planar shape of portions of the electrode at connections between the islands and the connecting portion is tapered from the islands toward the connecting portion. Since liquid crystal molecules are thereby oriented at the connections from both sides of the connecting portion, even when disclination occurs near the connections, it can be concentrated toward the connecting portion. Consequently, a reduction in display quality due to such disclination is minimized, and superior display is possible.

In the liquid crystal display device of the invention, preferably, the connecting portion extends from corners or outwardly projecting edges of the islands in plan view. This can substantially increase the margin of alignment error of the substrates holding the liquid crystal layer therebetween. For example, in a case in which an electrode having islands and a connecting portion is provided on one of the substrates, and a boundary sloping area in the multigap structure is provided on the other substrate, the substrates are aligned so that the connecting portion is disposed above the boundary sloping area. When the boundary sloping area overlaps with an island due to the alignment error of the substrates, the display contrast is reduced by the influence of the boundary sloping area. Since the above structure can reduce the overlapping portion between the island and the boundary sloping area, the reduction in the display quality due to the alignment error can be minimized.

In the liquid crystal display device of the invention, a reflective film may be provided in a portion of the dot region including the reflective display region, and the reflective film may cover the dot region except for the transmissive display region. This allows the reflective film provided outside the reflective display region to function as a shielding film. Consequently, leakage of light outside the transmissive display region can be effectively blocked, and the transmissive display contrast can be enhanced.

In the liquid crystal display device of the invention, preferably, the reflective film covers the dot region except for the planar region of an island disposed in the transmissive display region. In this case, the connecting portion for connecting the island is also shielded by the reflective film. In particular, by providing the reflective film at the connecting portion disposed above the boundary sloping area, light leakage from the boundary sloping area in which the alignment of the liquid crystal is apt to be disturbed can be prevented, and the contrast can be enhanced.

The liquid crystal display device of the invention can further include a plurality of color filters of different colors corresponding to the dot regions, and two of the color filters may overlap with each other in each of the dot regions except for the islands. In this case, since the transmittance of a non-display region in the dot region is reduced, and the non-display region can function as a shielding means by stacking the color filters, light leakage from the non-display region is reduced, and the transmissive display contrast is enhanced. When the reflective film extends to the region except for the transmissive display region, light reflected by such a reflective film can be prevented from returning to the incident side, and therefore, the reflective display contrast can be enhanced.

In the liquid crystal display device of the invention, a color filter can be provided on a side of at least one of the substrates, the side being close to the liquid crystal layer, and has an opening in a planar region of an island disposed in the reflective display region, and the opening is provided two-dimensionally apart from the boundary sloping area and the periphery of the island. By forming the opening in the color filter in the reflective display region, the luminance of the reflective display can be increased, the chromaticities in the reflective display and the transmissive display can be balanced well, and high-luminance, high-quality color display is possible. Since the opening in the reflective display region is apart from the edge of the island and the boundary sloping area, even when the alignment is disturbed at the edge of the islands and the boundary sloping area, the disturbance is not visibly recognized by the user because the reflectance of the regions is made low by the color filter.

In the liquid crystal display device of the invention, the island disposed in the reflective display region may have a planar area larger than that of the island disposed in the transmissive display region. As described above, in the liquid crystal display device of the invention having the multigap structure, the alignment control effect of the edge of the island in the reflective display region is greater than the alignment control effect in the transmissive display region. Therefore, even when the island in the reflective display region is larger than the island in the transmissive display region, a similar alignment control effect can be obtained. Consequently, when the luminance balance between the reflective display and the transmissive display is adjusted according to the application, it can be adjusted by the planar areas of the islands in both the regions.

In the liquid crystal display device of the invention, a signal line for supplying an electric signal to the electrode in the dot region extends along the edge of the dot region, and the island disposed in the transmissive display region is disposed more apart from the signal line in plan view than the island disposed in the reflective display region.

Near the signal line, an unnecessary oblique electric field is sometimes generated because of the potential, and may disturb the alignment of the liquid crystal. For this reason, it is preferable that the signal line be disposed at a certain distance from the islands. However, when the distance therebetween increases, the aperture ratio of the dot region decreases. Accordingly, in the transmissive display region in which the alignment control force at the edge of the island is weaker and the influence of the electric field at the signal line is greater than in the reflective display region, the island and the signal line are disposed at a greater distance from each other. Consequently, the distance between the signal line and the island can be optimized in both the reflective display region and the transmissive display region, and the optimal aperture ratio can be ensured in both the reflective display region and the transmissive display region while preventing the display quality from being reduced by the disturbance of the alignment due to the oblique electric field generated near the signal line.

In the liquid crystal display device of the invention, a two-terminal nonlinear element electrically connected to the signal line and the electrode is provided corresponding to the dot region on a surface face of one of the substrates, the surface being close to the liquid crystal layer, and the signal line is provided along the short side of the dot region.

In a liquid crystal display device using the two-terminal nonlinear element as a switching element, the signal line is provided in only one direction on one of the substrates. By providing the signal line along the short side of the dot region, an area on which an oblique electric field generated by the potential of the signal line acts is made small with respect to the dot region. Consequently, even when the signal line and the island are disposed at a greater distance from each other to prevent the influence of the electric field at the signal line than in the case in which the signal line is provided along the long side of the dot region, the reduction in the aperture ratio of the entire dot region is limited, and a bright display can be obtained in both the transmissive display and the reflective display.

In the liquid crystal display device of the invention, a switching element may be electrically connected to the electrode including the islands and the connecting portion, and the reflective film may extend to the switching element. In this case, even when the alignment of the liquid crystal is disturbed near the switching element because of the electric field, the reflective film functions as a shielding device, and can prevent light leakage. This allows a high-contrast display.

In the liquid crystal display device of the invention, preferably, a light-scattering device for scattering reflected light is provided on the liquid-crystal-layer side of the substrate having the reflective film, and the light scattering device is provided in the planar region of the island disposed in the reflective display region. In this structure, a bright reflective display is possible, unnecessary light reflected by the non-display region can be prevented from reaching the user, and the visibility can be enhanced.

In order to overcome the above problems, the invention also provides a liquid crystal display device including a pair of substrates each having an electrode on one side, and a liquid crystal layer disposed between the substrates with the electrodes therebetween, the substrates and the liquid crystal layer defining dot regions, wherein each of the dot regions includes a transmissive display region for transmissive display and a reflective display region for reflective display, wherein the liquid crystal layer contains liquid crystal that is initially aligned in the vertical direction, and the thickness thereof differs between the transmissive display region and the reflective display region. At least one of the electrodes of the substrates includes, in the dot region, a plurality of islands and a connecting portion for electrically connecting the adjoining islands, the islands include an integral number of island disposed in each of the transmissive display region and the reflective display region, and an island disposed in the reflective display region has a planar area larger than an island disposed in the transmissive display region.

The liquid crystal display device having this configuration is also a vertically-aligned transflective liquid crystal display device having a multigap structure, and an electrode in a dot region includes a plurality of islands and a connecting portion for electrically connecting the islands, in a manner similar to that in the above-described liquid crystal display device. In such a structure in which the electrode in the dot region includes a plurality of islands, the tilting direction of homeotropic liquid crystal can be pointed toward the centers of the islands by oblique electric fields generated at the edges of the islands by the application of a voltage. As a result, a plurality of liquid crystal domains in a radially aligned state are formed in the planar regions of the islands. A uniform viewing-angle characteristic can be obtained in all directions because of the liquid crystal domains. Moreover, since the boundary between the liquid crystal domains is fixed at the boundary between the adjoining islands, unevenness like stains does not appear when the panel is obliquely viewed, and superior display is possible.

In this case, the island disposed in the reflective display region is two-dimensionally larger than the island disposed in the transmissive display region. Since the thickness of the liquid crystal layer is smaller in the reflective display region than in the transmissive display region of the dot region in the multigap structure, an alignment control force of an oblique electric field generated at the edge of the island is strong, and can control the alignment of liquid crystal molecules in a wider region than in the transmissive display region. Accordingly, in this case, the aperture ratio of the reflective display region is increased by making the island in the reflective display region larger than the island in the transmissive display region, thereby achieving a bright reflective display. While the luminance balance between the transmissive display and the reflective display is sometimes changed depending on the characteristics of an electronic apparatus or the like, in which the liquid crystal display device is mounted, in the transflective liquid crystal display device, it can be adjusted by thus enlarging the island in the reflective display region.

Therefore, this can provide a liquid crystal display device which can perform a high-contrast display in both the reflective display and the transmissive display without causing unevenness like stains and image sticking, and which is easily and widely applicable.

The invention can further provide a liquid crystal display device including a pair of substrates each having an electrode on one side, and a liquid crystal layer disposed between the substrates with the electrodes therebetween, the substrates and the liquid crystal layer defining dot regions. Each of the dot regions includes a transmissive display region for transmissive display and a reflective display region for reflective display. The liquid crystal layer contains liquid crystal that is initially aligned in the vertical direction, and the thickness thereof differs between the transmissive display region and the reflective display region. At least one of the electrodes of the substrates includes, in the dot region, a plurality of islands and a connecting portion for electrically connecting the adjoining islands. The islands include an integral number of island disposed in each of the transmissive display region and the reflective display region, and wherein the electrode includes, in the planar regions of the islands, alignment control means for controlling the alignment state of the liquid crystal when an electric field is applied, and an alignment control means disposed in the reflective display region has a planar area smaller than that of an alignment control means disposed in the transmissive display region.

The liquid crystal display device having this configuration can also be a vertically-aligned transflective liquid crystal display device having a multigap structure, and an electrode in a dot region includes a plurality of islands and a connecting portion for electrically connecting the islands, in a manner similar to that in the above liquid crystal display device. In such a structure in which the electrode in the dot region includes a plurality of islands, the tilting direction of homeotropic liquid crystal can be pointed toward the centers of the islands by oblique electric fields generated at the edges of the islands by the application of a voltage. As a result, a plurality of liquid crystal domains in a radially aligned state are formed in the planar regions of the islands. A uniform viewing-angle characteristic can be obtained in all directions because of the liquid crystal domains. Moreover, since the boundary between the liquid crystal domains is fixed at the boundary between the adjoining islands, unevenness like stains does not appear when the panel is obliquely viewed, and superior display is possible.

In this case, the alignment control device in the reflective display region is smaller than the alignment control device in the transmissive display region. This can increase the aperture ratio of the reflective display region, and can perform a bright reflective display. Since the thickness of the liquid crystal layer is smaller in the reflective display region than in the transmissive display region in the dot region of the multigap structure, the alignment control force of an oblique electric field generated at the edge of the island increases, and the alignment control force of the alignment control devices provided in the electrode also increases. Therefore, even when the alignment control means is made small, as in this case, an alignment control effect equivalent to that in the transmissive display region can be obtained, and a high-quality reflective display in which unevenness like stains and image sticking are effectively prevented can be obtained.

Aspects of the invention can further provide a liquid crystal display device including a device substrate having a pixel electrode and a signal line extending along an edge of the pixel electrode, a counter substrate having a counter electrode on one side, and a liquid crystal layer disposed between the device substrate and the counter substrate, the substrates and the liquid crystal layer defining dot regions, wherein each of the dot regions includes a transmissive display region for transmissive display and a reflective display region for reflective display. The liquid crystal layer contains liquid crystal that is initially aligned in the vertical direction, and the thickness thereof differs between the transmissive display region and the reflective display region, and wherein the distance between the pixel electrode and the signal line in the reflective display region is shorter than in the transmissive display region.

In this case, the positions of the pixel electrode and the signal line are defined in a vertically-aligned transflective liquid crystal display device having a multigap structure. The liquid crystal display device has signal lines electrically connected to pixel electrodes in dot regions to supply a voltage to the pixel electrodes. These signal lines sometimes generate an oblique electric field therearound, depending on the voltage supplied to the pixel electrodes. When such an oblique electric field acts on the liquid crystal in the display region, the alignment may be disturbed, and the display quality may be reduced. Therefore, it is preferable that a pixel electrode and a signal line be arranged at a certain distance from each other. However, when the distance therebetween increases, the aperture ratio of the dot region decreases, and the display becomes dark. Accordingly, in this case, the distance between the pixel electrode and the signal line is made longer in the transmissive display region than in the reflective display region by utilizing the fact that the alignment control force of the edge of the electrode and the alignment control means is stronger in the reflective display region, in which the thickness of the liquid crystal layer is small, than in the transmissive display region in the vertically aligned liquid crystal display device having a multigap structure. This can achieve a high-quality display in which unevenness like stains and image sticking are prevented in the transmissive display and the reflective display while minimizing the reduction in the aperture ratio of the dot region.

An exemplary electronic apparatus of the invention has the above-described liquid crystal display device of the invention. This provides an electronic apparatus having a display section that can perform display in both a transmission mode and a reflection mode, and achieves a high-contrast display with a wide viewing angle in both the modes.

BRIEF DESCRIPTION OF THE DRAWINGS

The invention will be described with reference to the accompanying drawings, wherein like numerals reference like elements, and wherein:

FIG. 7 is a structural plan view of a pixel region in a liquid crystal display device of a fifth embodiment;

FIG. 10 is a structural plan view of a pixel region in a liquid crystal display device of an eighth embodiment.

DETAILED DESCRIPTION OF PREFERRED EMBODIMENTS

Exemplary embodiments of the invention will be described below with reference to the drawings. In the following drawings, layers and members are shown on different scales in order to make the layers and members more recognizable.

Figure 1:
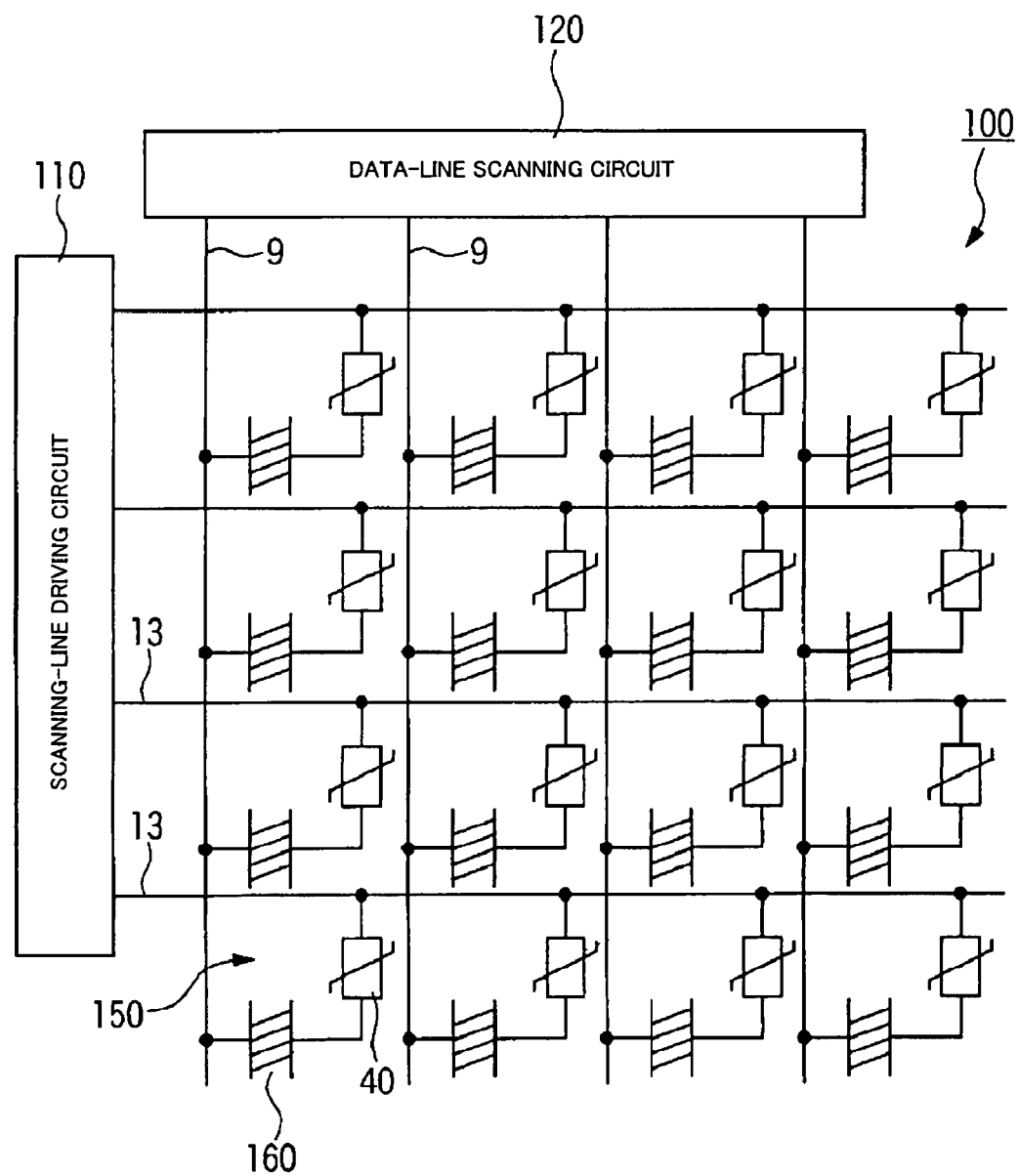
FIG. 1 is an exemplary circuit diagram of a liquid crystal display device according to a first embodiment.
Figure 2:
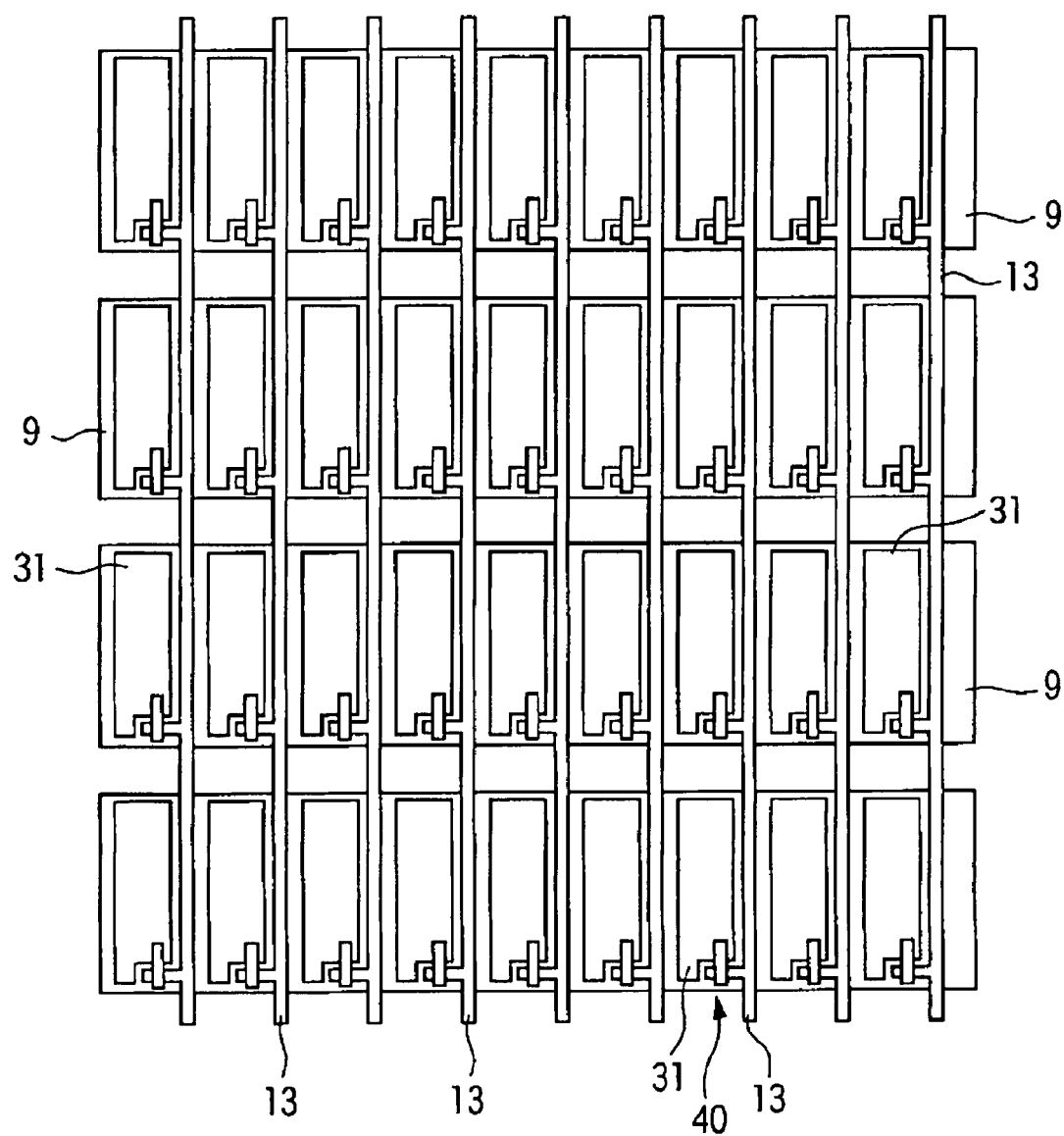
FIG. 2 is an explanatory view showing, in plan, an electrode structure in the first embodiment.
Figure 3A:
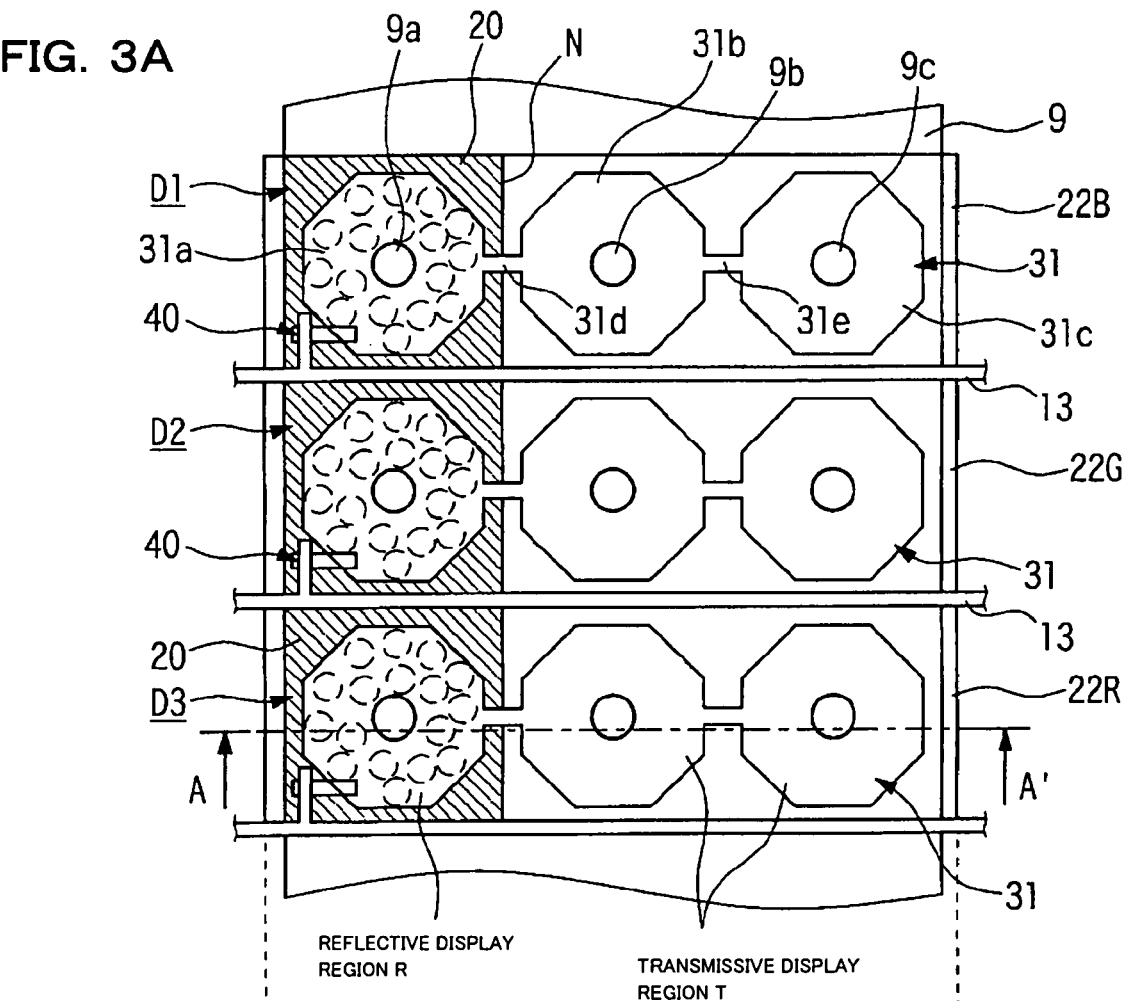
FIGS. 3(a) and 3(b) are enlarged structural plan and structural sectional views of a pixel region in the first embodiment.
Figure 3B:
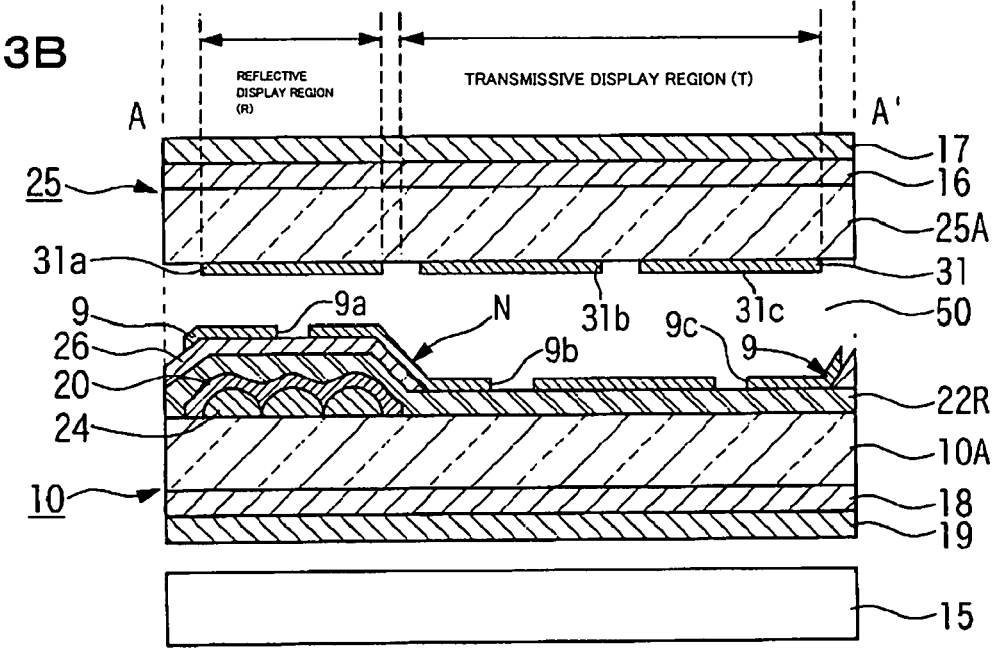

FIG. 1 is an exemplary circuit diagram of a liquid crystal display device according to a first embodiment of the invention, FIG. 2 is a structural plan view of one pixel region in the liquid crystal display device, and FIGS. 3(a) and 3(b) are an enlarged structural plan view and a structural sectional view, respectively, of the pixel region. A liquid crystal display device shown in these figures is an active-matrix color liquid crystal display device using TFDs (thin film diodes) (two-terminal nonlinear elements) as switching elements. The liquid crystal display device of this embodiment can include a liquid crystal layer made of a liquid crystal having a negative dielectric anisotropy that is initially aligned in the vertical direction.

As shown in FIG. 1, a liquid crystal display device 100 of this exemplary embodiment includes a scanning-signal driving circuit 110 and a data-signal driving circuit 120. The liquid crystal display device 100 also can include signal lines, that is, a plurality of scanning lines 13 and a plurality of data lines 9 crossing the scanning lines 13. The scanning lines 13 are driven by the scanning-signal driving circuit 110, and the data lines 9 are driven by the data-signal driving circuit 120. In each pixel region 150, a TFD 40 and a liquid crystal display element 160 (liquid crystal layer) are connected in serial between a scanning line 13 and a data line 9. While the TFD 40 is connected to the scanning line 13 and the liquid crystal display element 160 is connected to the data line 9 in FIG. 1, conversely, the TFD 40 may be connected to the data line 9 and the liquid crystal display element 160 may be connected to the scanning line 13.

A description will now be given of the planar structure of electrodes provided in the liquid crystal display device of this embodiment with reference to FIG. 2. As shown in FIG. 2, in the liquid crystal display device of this embodiment, pixel electrodes 31 that are rectangular in plan view and connected to the scanning lines 13 through the TFDs 40 are arranged in a matrix, and common electrodes 9 are arranged like strips (in stripes) in plan view to oppose the pixel electrodes 31 in the direction perpendicular to the plane of the figure. The common electrodes 9 define the data lines shown in FIG. 1, and are formed like stripes to cross the scanning lines 13. In this embodiment, a region having each pixel electrode 31 defines one dot region, and display can be performed in each of the dot regions arranged in a matrix.

Each TFD 40 serves as a switching element for connecting a scanning line 13 and a pixel electrode 31. For example, the TFD 40 has an MIM structure including a first conductive film containing Ta as the main component, an insulating film provided on the surface of the first conductive film and containing $Ta_2O_3$ as the main component and a second conductive film provided on the surface of the insulating film and containing Cr as the main component. The first conductive film of the TFD 40 is connected to the scanning line 13, and the second conductive film is connected to the pixel electrode 31.

The pixel structure of the liquid crystal display device 100 of this exemplary embodiment will now be described with reference to FIGS. 3(a) and 3(b). FIG. 3(a) is a structural plan view of one pixel region in the liquid crystal display device 100, and FIG. 3(b) is a structural sectional view, taken along line A-A' in FIG. 3(a). The liquid crystal display device 100 of this embodiment includes dot regions each having a pixel electrode 31 inside an area surrounded by data lines 9, scanning lines 13, etc., as shown in FIG. 2. A color filter of one of the three primary colors is provided corresponding to one dot region, and three dot regions (D1, D2, and D3) constitute a pixel including color filters 22R, 22G, and 22B of the three colors, as shown in FIG. 3(a).

A pixel electrode 31 includes three islands 31a to 31c, and connecting portions 31d and 31e for electrically connecting the adjoining islands, as shown in FIG. 3(a). More specifically, the islands 31a to 31c generally shaped like a regular octagon in plan view are arranged in the extending direction of the scanning lines 13 along the side edges of the dot region, and the connecting portions 31d and 31e extend substantially parallel to the scanning lines 13, respectively, between the islands 31a and 31b and between the islands 31b and 31c. The island 31a is electrically connected to a TFD 40.

The island 31a is provided inside a part of each dot region in which a reflective film 20 is provided, and the remaining islands 31b and 31c are provided in the other part in which the reflective film 20 is not provided.

The planar region of the island 31a provided in the part having the reflective film 20 (and a part of the connecting portion 31d) serves as a reflective display region R in the liquid crystal display device 100, and the planar regions of the islands 31b and 31c, a part of the connecting portion 31d, and the connecting portion 31e constitute a transmissive display region T.

As shown in FIG. 3(b), in the liquid crystal display device 100 of this embodiment, a liquid crystal layer 50 made of a liquid crystal material that is initially aligned in the vertical direction, that is, that has a negative dielectric anisotropy, is disposed between an upper substrate (device substrate) 25 and a lower substrate (counter substrate) 10 disposed opposed thereto. A backlight (illumination device) 15 serving as a source of light for transmissive display is provided on the outer side of the lower substrate 10.

In this way, the liquid crystal display device of this embodiment is a vertically aligned liquid crystal display device having the homeotropic liquid crystal layer 50, and a transflective liquid crystal display device capable of reflective display and transmissive display.

In the lower substrate 10, a reflective film 20 made of a metal having high reflectance, such as aluminum or silver, is partially provided on the surface of a substrate body 10A made of a transmissive material, such as quartz or glass, with an insulating film 24 therebetween. The reflective display region R is provided in a region in which the reflective film 20 is provided.

The insulating film 24 provided on the substrate body 10A has surface irregularities. In conformance with such irregularities, the surface of the reflective film 20 also has irregularities. Since reflective light is scattered by such irregularities, mirror reflection is prevented, and high visibility is achieved.

A red color filter 22R is provided on the reflective film 20 and substrate body 10A in the dot region from the reflective display region R to the transmissive display region T. In plan view, color filters 22R (red), 22G (green), and 22B (blue) of the three colors are arranged, and the scanning lines 13 extend right above the boundaries between the adjoining color filters, as shown in FIG. 3(a).

An insulating film 26 can be selectively provided on the color filter 22R above the reflective film 20. The insulating film 26 thus partially provided in the dot region makes a difference in the thickness of the liquid crystal layer 50 between the reflective display region R and the transmissive display region T. For example, the insulating film 26 is made of a film of an organic material, such as acrylic resin, having a thickness of approximately 0.5 μm to 2.5 μm, and defines a boundary sloping area N, which is formed of an inclined face and in which the thickness thereof continuously changes, near the boundary between the reflective display region R and the transmissive display region T. The thickness of the liquid crystal layer 50 in the transmissive display region T is approximately 2 μm to 7 μm, and the thickness in the reflective display region R is almost half the thickness in the transmissive display region T.

In this way, the insulating film 26 functions as a liquid-crystal-layer thickness adjusting layer whose thickness makes a difference in the thickness of the liquid crystal layer 50 between the reflective display region R and the transmissive display region T. In this embodiment, an edge of an upper flat surface of the insulating film 26 is substantially aligned with an edge of the island 31a that constitutes the pixel electrode 31 in the upper substrate 25, and the boundary sloping area N formed by the insulating film 26 is disposed right below the connecting portion 31d between the islands 31a and 31b.

A common electrode 9 made of a transparent conductive material, such as ITO, is provided on the surface of the lower substrate 10 including the surface of the insulating film 26. The common electrode 9 extends in stripes in the direction perpendicular to the plane of the paper in plan view, and functions as an electrode common to a plurality of dot regions arranged in the direction perpendicular to the plane of the paper. The common electrode 9 is partially cut out to form apertures 9a to 9c corresponding to each dot region. As shown in FIG. 3(a), the apertures 9a to 9c are provided corresponding to the islands 31a to 31c of the pixel electrode 31, and are provided at almost the centers of the planar regions of the islands 31a to 31c.

Although not shown, a vertical alignment film composed of polyimide or the like is provided to cover the common electrode 9. The vertical alignment film is an alignment film that allows liquid crystal molecules to be aligned perpendicularly to the film surface. In this embodiment, it is preferable that the vertical alignment film be not subjected to alignment treatment, such as rubbing.

While the reflective film 20 and the common electrode 9 are separately disposed in this embodiment, a reflective film made of a metal material may be used as a part of a common electrode in the reflective display region R.

In the upper substrate 25, a pixel electrode 31 made of a transparent conductive material, such as ITO, and having a planar shape shown in FIG. 3(a) is provided on a substrate body 25A made of a transmissive material, such as glass or quartz, close to the liquid crystal layer 50. A TFD 40 and a scanning line 13 are provided corresponding to the pixel electrode 31. Although not shown, a vertical alignment film composed of polyimide or the like is provided to cover the pixel electrode 31.

A circularly polarizing plate in which a retardation plate 18 and a polarizer 19 are stacked from the side of the substrate body 10A is provided on the outer side of the lower substrate 10. A circularly polarizing plate in which a retardation plate 16 and a polarizer 17 are stacked from the side of the substrate body 25A is provided on the outer side of the upper substrate 25. That is, in the liquid crystal display device 100 of this exemplary embodiment, circularly polarized light is caused to enter the liquid crystal layer 50 for display. Unlike the case in which linearly polarized light enters the liquid crystal layer 50, the transmittance inside the dot region is uniform, regardless of the alignment direction of the liquid crystal molecules when a voltage is applied, and the aperture ratio of the dot region can be substantially increased. Therefore, the display luminance of the liquid crystal display device can be increased.

The above circularly polarizing plate may be a circularly polarizing plate including a combination of a polarizer and a quarter-wave retardation plate, a broad-band circularly polarizing plate including a combination of a polarizer, a half-wave retardation plate, and a quarter-wave retardation plate, or a circularly polarizing plate having a viewing-angle compensating function obtained by combining a polarizer, a half-wave retardation plate, a quarter-wave retardation plate, and a negative C-plate. The term "C-plate" refers to a retardation plate having an optical axis in the thickness direction.

In the liquid crystal display device of this embodiment having the above configuration, the pixel electrode 31 has a structure in which the islands 31a to 31c shaped like a regular octagon are electrically connected by the connecting portions 31d and 31e, and the apertures 9a to 9c are provided in the common electrode 9 corresponding to the islands 31a to 31c. Therefore, the tilting direction of liquid crystal molecules is properly controlled when an electric field is applied, and a display with a superior viewing-angle characteristic is possible. The alignment control effect will be described below.

First, in a state in which an electric field is not applied between the common electrode 9 and the pixel electrode 31 (when a voltage is not applied), liquid crystal molecules in the liquid crystal layer 50 are aligned perpendicularly to the substrate surface. When a voltage is applied between the electrodes 9 and 31, liquid crystal molecules disposed in the planar region of the island 31a are tilted in a direction perpendicular in the planar direction to the edge of the island 31a (toward the planar center of the island 31a) by an oblique electric field generated at the edge, and peripheral liquid crystal molecules are tilted in the same direction to conform to the alignment state at the edge of the island 31a. As a result, the liquid crystal molecules in the planar region of the island 31a are oriented toward the center of the regularly octagonal island 31a when the voltage is applied.

In this embodiment, the aperture 9a of a circular shape in plan view is provided at almost the center of the planar region of the island 31a. Therefore, an alignment control effect similar to that at the edge of the island 31a is also caused on the side of the common electrode 9, and liquid crystal molecules are oriented radially in plan view around the aperture 9a.

In this way, in the liquid crystal display device 100 of this exemplary embodiment, a liquid crystal domain, in which liquid crystal molecules are oriented radially in plan view in the planar region of the island 31a, is produced by an oblique electric field generated at the peripheral edge of the island 31a and around the aperture 9a when a voltage is applied. A liquid crystal domain in which molecules are oriented radially in plan view is also produced in the planar regions of the islands 31b and 31c by an alignment control effect similar to that in the island 31a.

In the liquid crystal display device 100 of this embodiment, by the above effect, the liquid crystal domains in which molecules are oriented radially in plan view are arranged in the dot regions D1 to D3 when a voltage is applied, and a uniform viewing-angle characteristic can be obtained in all directions by the liquid crystal domains. Moreover, since disclination caused at the centers of the liquid crystal domains is fixed at the islands 31a to 31c, unevenness like stains is not caused when the panel is viewed from an oblique direction.

Therefore, the liquid crystal display device 100 of this embodiment can perform a high-quality display with an extremely wide viewing angle.

Since the alignment states of liquid crystal in the islands 31a to 31c are controlled by the edges of the islands 31a to 31c and by the apertures 9a to 9c of the common electrode 9 provided corresponding to the islands 31a to 31c, as described above, even when the planar areas of the islands 31a to 31c in the dot region are increased, the alignment states of the liquid crystal can be controlled properly. More specifically, according to this embodiment, the alignment can be stabilized even when the islands 31a to 31c are relatively large, that is, have a diameter of approximately 40 µm to 50 µm.

In this embodiment, the planar shape of the islands 31a to 31c is regularly octagonal, however it should be understood that it is not limited to such a shape, and may be, for example, any of a circular shape, an elliptical shape, and a polygonal shape. That is, the islands 31a to 31c may have any planar shape that can form a liquid crystal domain in the planar region in which the liquid crystal molecules are substantially radially oriented when a voltage is applied.

It is preferable that the connecting portions 31d and 31e be thinner than the islands 31a to 31c. Since the islands 31a to 31c have a function of controlling the tilting direction of the liquid crystal molecules by oblique electric fields generated at the edges thereof, in order to stably obtain such an alignment control force, it is preferable that the ratio of the edges surrounding the planar centers of the islands be increased by reducing the widths of the connecting portions 31d and 31e. Such a structure also can increase the response speed of the liquid crystal.

In the liquid crystal display device 100 of this embodiment, the thickness of the liquid crystal layer 50 in the reflective display region R can be made almost half the thickness in the transmissive display region T by the insulating film 26 provided in the reflective display region R. Therefore, the retardation of the liquid crystal layer in the reflective display region R can be made substantially equal to the retardation of the liquid crystal layer in the transmissive display region T. Consequently, the same electrooptic characteristic can be ensured in both the regions, and the display contrast can be enhanced.

In addition, by adopting the above multigap structure, the boundary sloping area N provided in the dot region is disposed right below the connecting portion 31d extending between the island 31a in the reflective display region R and the island 31b in the transmissive display region T, and therefore, the quality can be effectively prevented from being reduced. In other words, when an electrode is provided in the boundary sloping area N, liquid crystal molecules are aligned at an angle to the substrate surface, and therefore, a weak alignment control force acts on the liquid crystal molecules when a voltage is applied. If the pixel structure is designed in disregard of the weak alignment control force, the alignment of the liquid crystal may be disturbed. Jisaki (introduced above) controlled the alignment by positively utilizing the weak alignment control force. In the liquid crystal display device of this embodiment, the electrode on the boundary sloping area N is minimized so that the weak alignment control force is removed, and conversely, a strong alignment control force generated by the oblique electric fields at the edges of the islands 31a and 31b becomes dominant. As a result, a proper display is possible in both the reflective display region R and the transmissive display region T.

In this way, in the liquid crystal display device of this embodiment, the tilting direction of the liquid crystal molecules in the liquid crystal layer in a vertical alignment mode can be properly controlled by the shape of the pixel electrode 31 in the upper substrate 25 and the apertures 9a to 9c provided in the common electrode 9, and the display quality can be effectively prevented from being reduced by the boundary sloping area N formed in the multigap structure. Accordingly, problems in display quality, such as unevenness like stains and image sticking, are not caused, and high-contrast reflective and transmissive display with a wide viewing angle can be achieved.

While the three islands 31a to 31c are linearly arranged in each of the dot regions D1 to D3 in the above embodiment, when the dot pitch is increased, it is sometimes better to increase the number of islands that constitute the pixel electrode 31. In this case, in the liquid crystal display device of this embodiment, each of the reflective display region and the transmissive display region is defined by an integral number of island, and the boundary sloping area N on the boundary between the regions that are different in the thickness of the liquid crystal layer is provided between the islands. For example, in a case in which 6×2 (twelve) islands are arranged in a dot region, six of the islands are allocated to the reflective display region, and the remaining six islands are allocated to the transmissive display region. A region between the islands disposed in the transmissive display region and the islands disposed in the transmissive display region is disposed right above the boundary sloping area N.

While the substantially circular apertures 9a to 9c are provided as the alignment control device in the common electrode 9 in the above embodiment, dielectric protrusions may be provided as the alignment control device on the common electrode 9. In this case, an effect of controlling the tilting direction of liquid crystal molecules during the voltage application can be obtained, although the effect is different from the effect of the apertures 9a to 9c. Alternatively, both the apertures and the dielectric protrusions may be provided in the dot region. When dielectric protrusions have the same planar area as that of apertures, they have, in general, an alignment control force stronger than that of the apertures. Therefore, for example, it is preferable that apertures be provided in the reflective display region R in which the liquid crystal layer is thin, and dielectric protrusions be provided in the transmissive display region T in which the liquid crystal layer is thick. Dielectric protrusions may be provided inside the apertures 9a to 9c.

Figure 4:
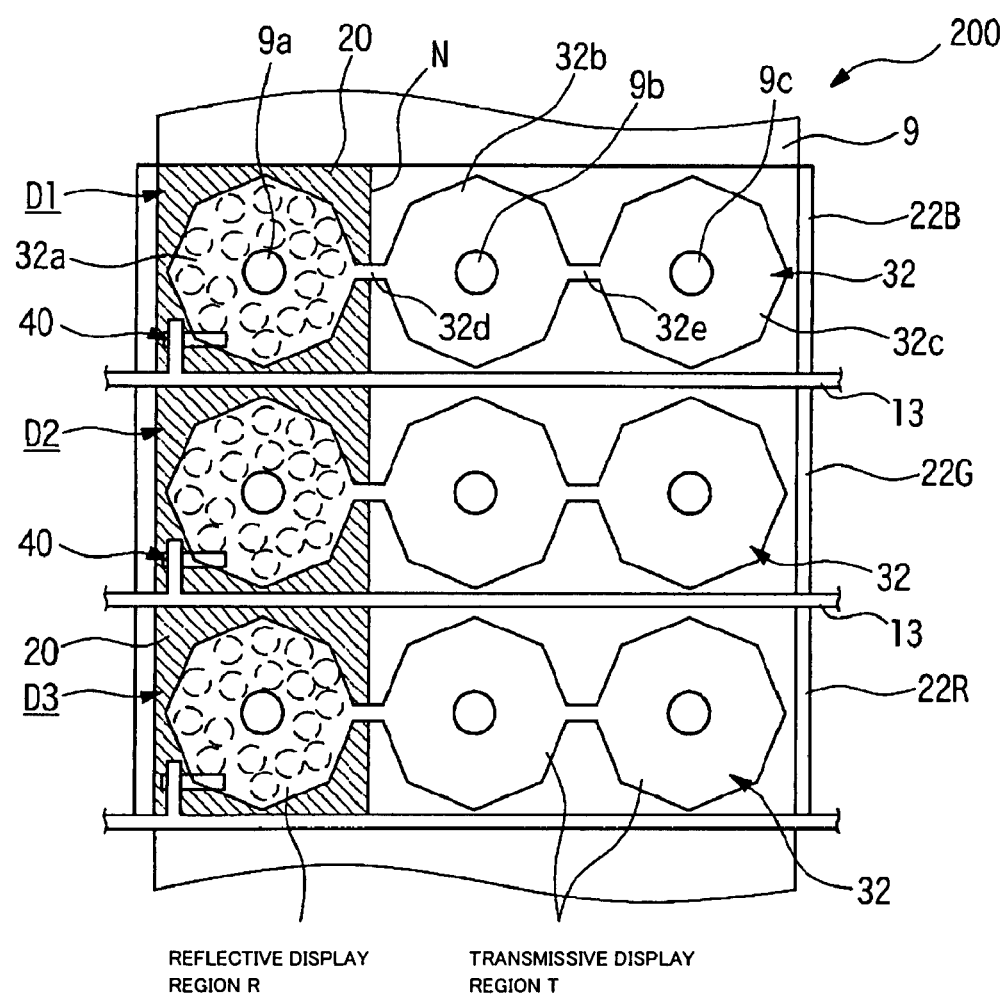
FIG. 4 is a structural plan view of a pixel region in a liquid crystal display device of a second embodiment.

Next, a liquid crystal display device of a second exemplary embodiment will be described with reference to the drawing. FIG. 4 is a view showing the planar structure of a pixel region in the liquid crystal display device of this embodiment, and corresponds to FIG. 3(a) for the first embodiment. A liquid crystal display device 200 of this embodiment is a multigap transflective vertically aligned liquid crystal display device having a configuration similar to that of the liquid crystal display device 100 shown in FIGS. 3(a) and 3(b), except in pixel electrodes 32 having a different planar shape. Therefore, in FIG. 4, components denoted by the same reference numerals as those in FIGS. 3(a) and 3(b) are considered as similar components, and a description thereof is omitted.

As shown in FIG. 4, in the liquid crystal display device 200 of this embodiment, a pixel electrode 32 that is different in planar shape from that in the liquid crystal display device 100 shown in FIGS. 3(a) and 3(b) is provided in each of dot regions D1 to D3.

The pixel electrode 32 is made of a transparent conductive material, such as ITO, and includes, in the dot region, islands 32a to 32c arranged in the extending direction of a scanning line 13 and shaped like a regular octagon in plan view, and connecting portions 32d and 32e extending in the direction of the scanning line 13 to electrically connect the islands 32a to 32c. The connecting portions 32d and 32e connect the corners of the islands 32a to 32c shaped like a regular octagon. A boundary sloping area N is disposed right below the connecting portion 32d that connects the island 32a provided in a reflective display region R and the island 32b provided in a transmissive display region T.

In the liquid crystal display device 200 of this exemplary embodiment having the above configuration, the islands 32a to 32c are electrically connected by the connecting portions 32d and 32e extending from the corners of the islands, and the connecting portion 32d is disposed right above the boundary sloping area N. Therefore, display quality can be prevented from being reduced by the alignment error between substrates 10 and 25 during panel assembly, and ease of production is increased. In other words, the connecting portion 32d is designed to be placed above the boundary sloping area N, and display quality similar to that in the above first embodiment is ensured when the panel assembly is performed as designed. However, for example, when the substrate 10 and the substrate 25 are improperly aligned with each other in the lateral direction in the figure during panel assembly, and the island 32a or 32b overlaps with the boundary sloping area N, since the corner of the regular octagon overlaps with the boundary sloping area N in the liquid crystal display device 200, an overlapping portion between the boundary sloping area N and the island can be reduced, and disturbance of the alignment in the islands 32a and 32b due to the boundary sloping area N can be reduced, compared with the liquid crystal display device 100 of the first exemplary embodiment.

In the liquid crystal display device 200 of this embodiment, even when alignment disturbance or disclination occurs at the connections between the islands 32a to 32c and the connecting portions 32d and 32e, the influence of such alignment disturbance on the display quality can be reduced. That is, since the edges of the islands 32a and 32b close to the connecting portion 32d are tapered toward the connecting portion 32d, liquid crystal molecules are oriented while tilting from both sides toward lines, which link the corners and apertures 9a and 9b, because of an alignment control force of oblique electric fields during the voltage application. Therefore, even when the disclination occurs near the connections between the connecting portion 32d and the islands 32a and 32b, it is smoothly shifted from the islands 32a and 32b toward the connecting portion 32d or the apertures 9a and 9b because of the above-described alignment effect, and proper alignment can be maintained in the islands 32a and 32b.

While the connecting portions 32d and 32d extend from the corners of the islands 32a to 32c shaped like a polygon in plan view in this embodiment, when islands have an arbitrary shape other than the polygon in plan view, electrodes are also shaped in a substantially tapered form from the islands toward the connecting portions in the area in which the islands and the connecting portions are connected. In this case, even when positioning error is caused during the panel assembly process, overlapping between the planar area of the island and the boundary sloping area N can be minimized, and the display quality can be effectively prevented from being reduced by the boundary sloping area N. If disclination occurs, it can be shifted to the connecting portion or the aperture by the planar shape of the islands, and the influence on the display can be reduced.

Figure 5:
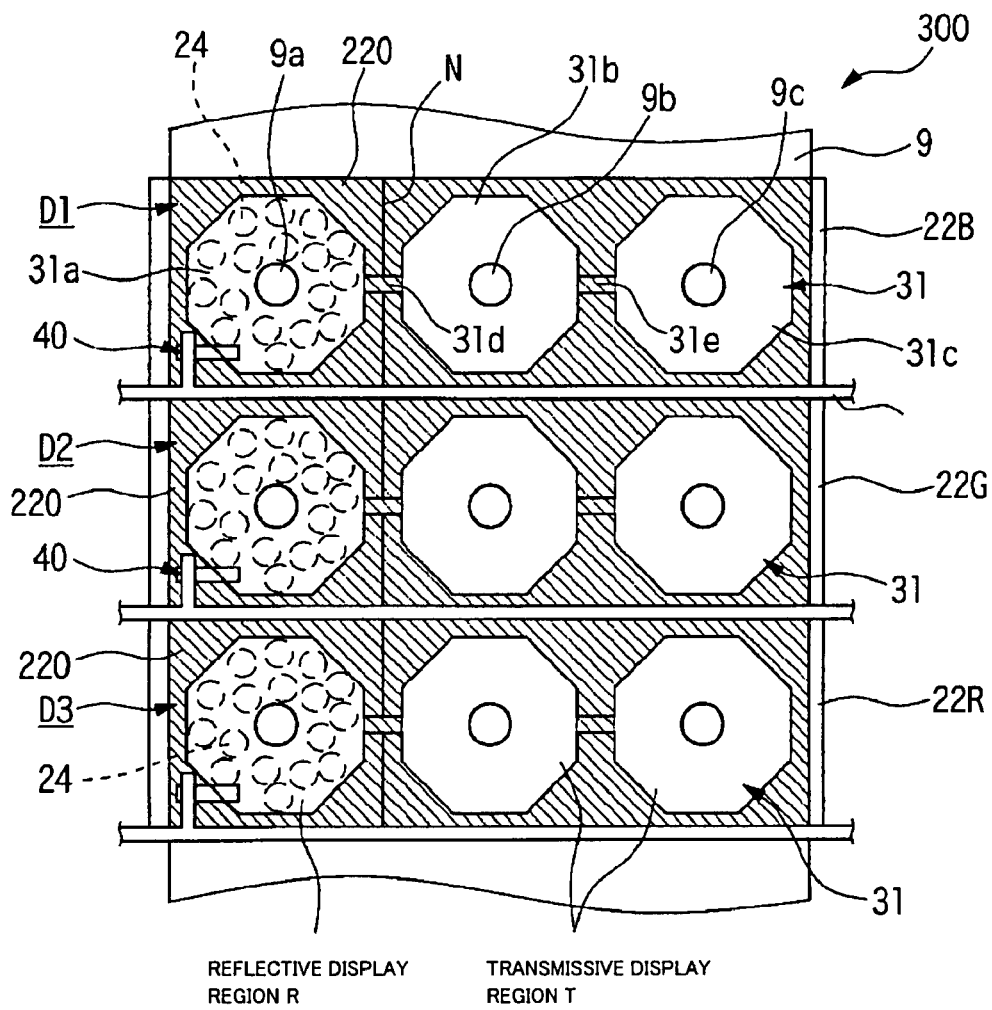
FIG. 5 is a structural plan view of a pixel region in a liquid crystal display device of a third embodiment.

Next, a liquid crystal display device of a third exemplary embodiment will be described with reference to the drawing. FIG. 5 is a view showing the planar structure of a pixel region in the liquid crystal display device of this embodiment, and corresponds to FIG. 3(a) for the first embodiment. A liquid crystal display device 300 of this embodiment is a multigap transflective vertically aligned liquid crystal display device having a configuration similar to that of the liquid crystal display device 100 shown in FIGS. 3(a) and 3(b), mainly except in an area in which a reflective film for reflective display is provided. Therefore, in FIG. 5, components denoted by the same reference numerals as those in FIGS. 3(a) and 3(b) are considered as similar components, and a description thereof is omitted.

In the liquid crystal display device 300 of this embodiment, a reflective film 220 having a planar shape different from that in the liquid crystal display device 100 shown in FIGS. 3(a) and 3(b) is provided in each of dot regions D1 to D3, as shown in FIG. 5.

The reflective film 220 can be made of a metal film of aluminum, silver, or the like, and is provided in the dot region except for islands 31b and 31c that define a transmissive display region T, of islands 31a to 31c and connecting portions 31d and 31e that constitute a pixel electrode 31. A portion of the reflective film 220 that is placed on the island 31a is not shown for easy view of the figure. Since the reflective film 220 can function as a light shielding film by thus extending in the dot region outside the transmissive display region T, the contrast of transmissive display can be increased.

Since the liquid crystal display device of the invention is a vertically aligned liquid crystal display device, in a case in which black display is performed in a state in which a voltage is not applied (normally black), liquid crystal molecules are kept aligned perpendicularly to the substrates, regardless of the voltage application state, in an area in which electrodes opposing with a liquid crystal layer therebetween are not provided. Therefore, such a reflective film 220 functioning as a light shielding film is actually unnecessary.

However, in actuality, the liquid crystal molecules tilt in the boundary sloping area N, and the liquid crystal alignment is disturbed by oblique electric fields at the edges of the islands 31a to 31c and the accumulation of charges in the area having no electrode, which may cause light leakage. Accordingly, by providing the reflecting film 220 functioning as a light shielding film in a non-display region, as in this embodiment, such light leakage can be prevented, and a high-contrast transmissive display can be performed.

Since an insulating film 24 for giving irregularities to the reflective film 220 is not provided outside the planar region of the island 31a (that is, the reflective display region R), even when external light is reflected by the reflective film 220 provided outside the islands 31a to 31c (that is, a non-display area in the dot region), the light is not reflected toward an observer. Therefore, the light has little influence on the display quality.

While color filters 22B, 22G, and 22R are provided, respectively, in the dot regions D1 to D3 in this embodiment, a color filter of a color other than the display colors in the dot regions may be placed outside the planar regions of the islands 31 in the area in which the reflective film 220 is provided (that is, the non-display areas in the dot regions). In such a structure, light incident on the non-display regions of the dot regions D1 to D3 is absorbed by the superimposed color filter, and is also absorbed after being reflected by the reflective film 220. Therefore, such light incident on the non-display regions rarely returns to the incident side, and a higher-contrast reflective display can be performed. Since such a color filter can be superimposed with comparative ease when the color filters 22R, 22G, and 22B are patterned in the dot regions, problems in the production process, such as an increase of the number of man hours, will hardly occur.

While the reflective film 220 is also provided in the planar regions of the connecting portions 31d and 31e in this embodiment, it may not be provided in the connecting portions 31d and 31e. However, when the connecting portion 31d is shielded by the reflective film 220, a section subjected to display failure due to alignment disturbance at the connecting portion 31d placed above the boundary sloping area N can be shielded, a high-contrast display is possible, and the reflective film 220 can be patterned easily.

Figure 6:
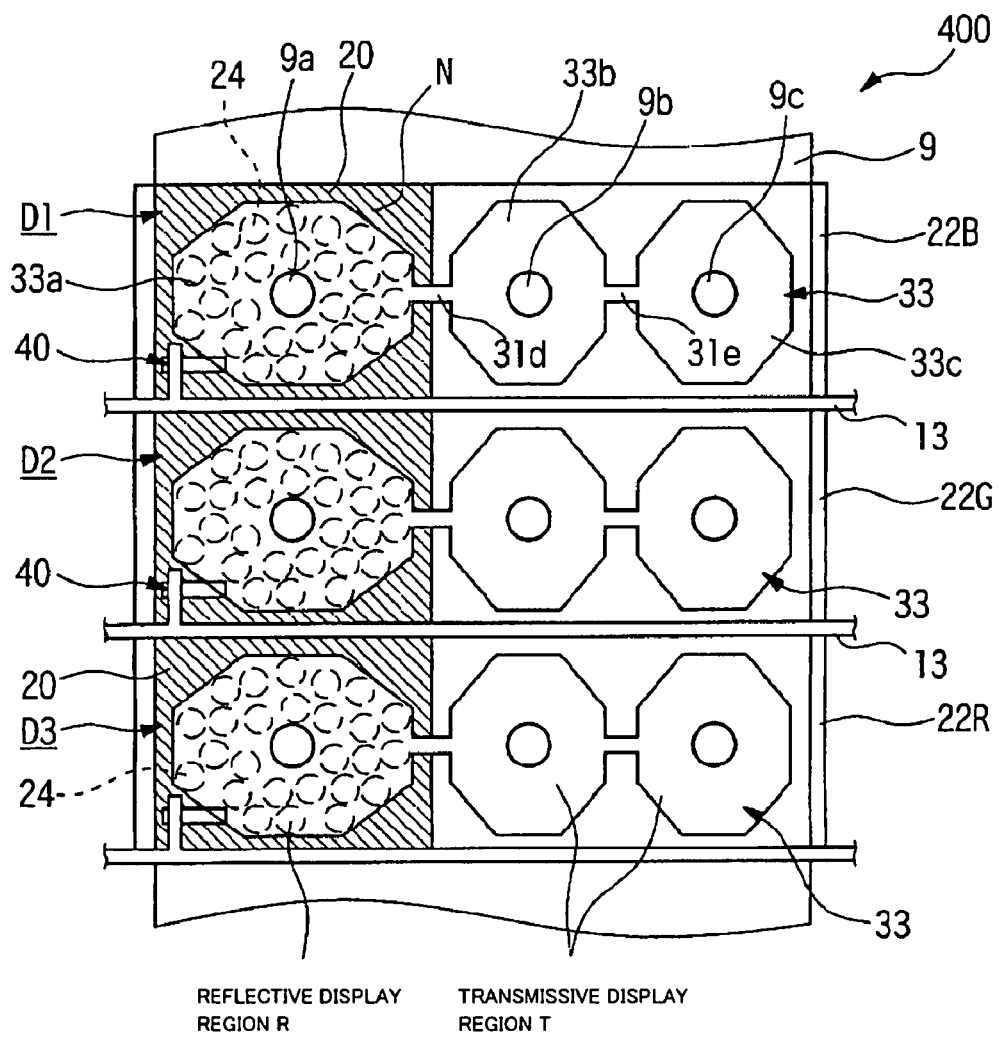
FIG. 6 is a structural plan view of a pixel region in a liquid crystal display device of a fourth embodiment.

Next, a liquid crystal display device of a fourth exemplary embodiment will be described with reference to the drawing. FIG. 6 is a view showing the planar structure of a pixel region in the liquid crystal display device of this embodiment, and corresponds to FIG. 3(a) for the first embodiment. A liquid crystal display device 400 of this embodiment is a multigap vertically-aligned transflective liquid crystal display device having a configuration similar to that of the liquid crystal display device 100 shown in FIGS. 3(a) and 3(b), except in pixel electrodes 33 having a different planar shape. Therefore, in FIG. 6, components denoted by the same reference numerals as those in FIG. 3 are considered as similar components, and a description thereof is omitted.

As shown in FIG. 6, in the liquid crystal display device 400 of this embodiment, pixel electrodes 33 having a planar shape different from that in the liquid crystal display device 100 shown in FIG. 3(a) are provided in dot regions D1 to D3.

Each pixel electrode 33 is made of a transparent conductive material, such as ITO, and includes, in a dot region, islands 33a to 33c arranged in the extending direction of a scanning line 13 and shaped like an octagon in plan view, and connecting portions 33d and 33e extending in the direction of the scanning line 13 to electrically connect the islands 33a to 33c. The connecting portions 33d and 33e extend from the adjoining edges of the octagonal islands 33a to 33c, thereby connecting the islands 33a to 33c. A boundary sloping area N is disposed right below the connecting portion 33d that connects the island 33a disposed in a reflective display region R and the island 33b disposed in a transmissive display region T.

As shown in FIG. 6, the island 33a that defines the reflective display region R has a planar area larger than those of the islands 33b and 33c arranged to define the transmissive display region T. Apertures 9a to 9c provided in a common electrode 9 corresponding to the islands 33a to 33c are equal in planar shape and size.

In a transflective liquid crystal display device, required display properties sometimes vary according to application of an electronic apparatus in which the liquid crystal display device is mounted. In such a case, the display areas of the reflective display region R and the transmissive display region T can be adjusted and the display properties of reflective display and transmissive display can be adjusted by making the island 33a in the reflective display region R relatively large, as in the liquid crystal display device 400 of this embodiment.

In the reflective display region R, the thickness of a liquid crystal layer 50 is relatively small because of the multigap structure, and therefore, an alignment control force at the edge of the island 33a is stronger than in the islands 33b and 33c in the transmissive display region T. Accordingly, even when the planar area of the island 33a is relatively large, the alignment state of the liquid crystal can be properly controlled by the alignment control effect at the edge of the island. Moreover, since the response of the liquid crystal molecules will not become slower than in the transmissive display region T, high-quality display can be performed without causing unevenness like stains and image sticking.

Therefore, the liquid crystal display device 400 of this embodiment can adjust reflective display and transmissive display according to the application without reducing the display quality, and is generally applicable as a display in various electronic apparatuses.

Next, a liquid crystal display device of a fifth exemplary embodiment will be described with reference to the drawing. FIG. 7 is a view showing the planar structure of a pixel region in the liquid crystal display device of this embodiment, and corresponds to FIG. 3(a) for the first embodiment. A liquid crystal display device 500 of this embodiment is a multigap vertically-aligned transflective liquid crystal display device having a configuration similar to that of the liquid crystal display device 100 shown in FIGS. 3(a) and 3(b), except in the structure of a color filter provided in each dot region. Therefore, in FIG. 7, components denoted by the same reference numerals as those in FIGS. 3(a) and 3(b) are considered as similar components, and a description thereof is omitted.

As shown in FIG. 7, color filters 222B, 222G, and 222R having a planar shape different from that in the liquid crystal display device 100 shown in FIG. 3(a) are provided, respectively, in dot regions D1 to D3 in the liquid crystal display device 500 of this embodiment. In order for the figure to be easily viewed, a reflective films 20 in a reflective display region R (a planar region of an island 31a) and irregularities provided on the reflective film 20 in the same region are not shown.

The color filters 222R, 222G, and 222B respectively have openings 22r, 22g, and 22b shaped like a circle in plan view and disposed in the planar regions of islands 31a in pixel electrodes 31. These openings 22r, 22g, and 22b are concentric with apertures 9a provided in a common electrode 9.

In the liquid crystal display device 500 having the above-described configuration, portions having no color filter (openings 22r, 22g, and 22b) are provided in the reflective display regions R. Consequently, it is possible to establish harmony of the chromaticity with the transmissive display region T, to increase the brightness of the reflective display, and to perform both the reflective display and transmissive display of high quality in which the luminance and chromaticity are well-balanced.

As shown in FIG. 7, the rims of the openings 22r, 22g, and 22b are separate from the edges of the islands 31a, and also from boundary sloping areas N. Since alignment disturbance is prone to occur at the edges of the islands 31a and in the boundary sloping areas N because of an oblique electric field generated by the application of a voltage, a decrease in display contrast and image sticking resulting from the alignment disturbance are made less visible by providing the color filters 222R, 222G, and 222B in those portions. Consequently, the brightness in the reflective display region R can be increased without a substantial reduction in display quality.

As shown in FIG. 7, the openings 22r, 22g, and 22b have different planar areas in the color filters 222R, 222G, and 222B. More specifically, the openings 22r, 22g, and 22b have different sizes corresponding to the luminosities for the display colors. The opening 22g of the green color filter 222G is the largest, and the opening 22b of the blue color filter 222B is the smallest. By thus making the sizes of the openings 22r, 22g, and 22b different corresponding to the colors, the color balance of the reflective display can be easily adjusted independently of the transmissive display, and the display quality can be improved further.

While the planar shape of the openings 22r, 22g, and 22b of the color filters is circular in this embodiment, it should be understood that it is not limited to the circular shape. For example, a ring-shaped opening may be provided so that a color filter remains corresponding to the aperture 9a, and the planar shape may be regularly octagonal in conformity to the outline of the island 31a.

Figure 8:
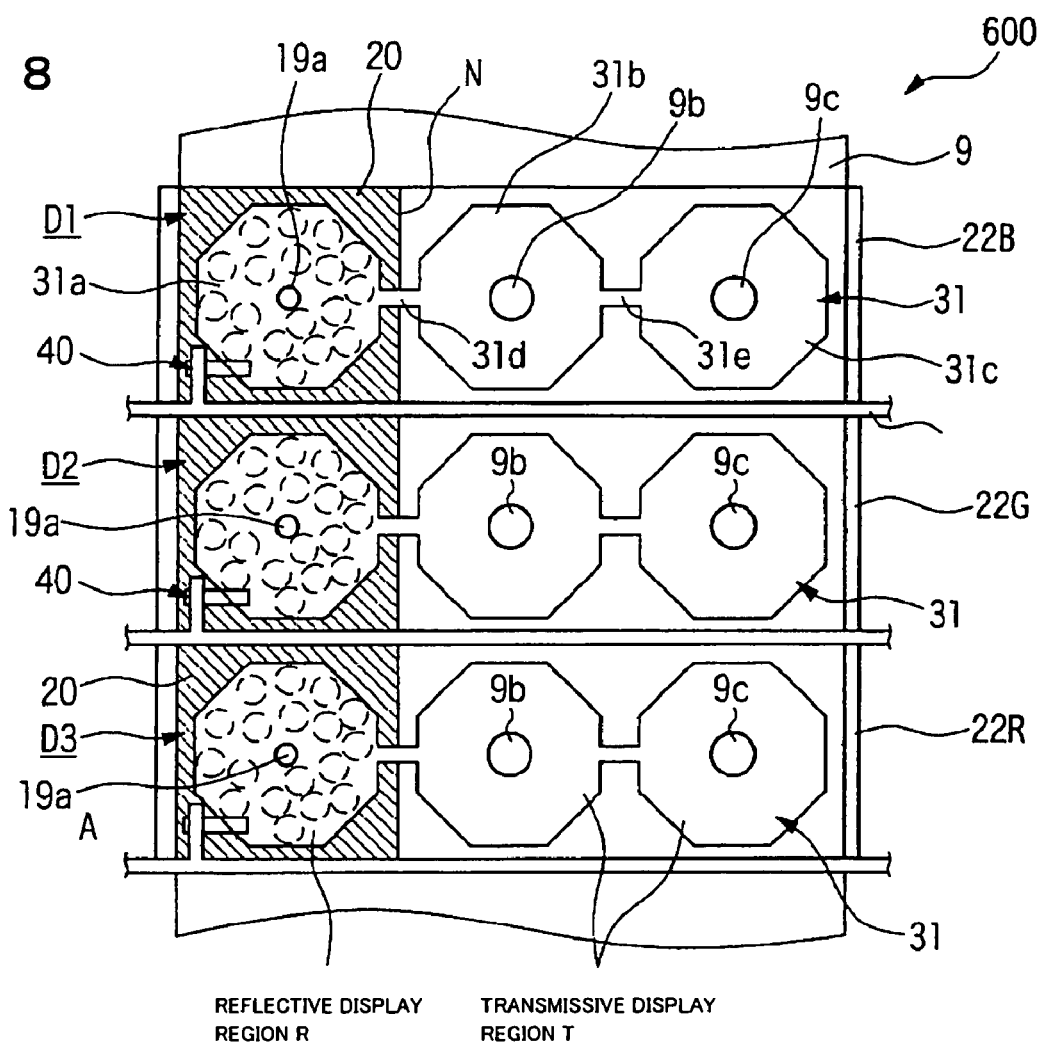
FIG. 8 is a structural plan view of a pixel region in a liquid crystal display device of a sixth embodiment.

Next, a liquid crystal display device of a sixth exemplary embodiment will be described with reference to the drawing. FIG. 8 is a view showing the planar structure of a pixel region in the liquid crystal display device of this embodiment, and corresponds to FIG. 3(a) for the first embodiment. A liquid crystal display device 600 of this embodiment is a multigap vertically-aligned transflective liquid crystal display device having a configuration similar to that of the liquid crystal display device 100 shown in FIGS. 3(a) and 3(b), except in the structure of apertures provided in a common electrode 9 to define alignment control means. Therefore, in FIG. 8, components denoted by the same reference numerals as those in FIGS. 3(a) and 3(b) are considered as similar components, and a description thereof is omitted.

As shown in FIG. 8, in the liquid crystal display device 600 of this embodiment, apertures 19a having a size different from that in the liquid crystal display device 100 shown in FIG. 3(a) are provided in the common electrode 9. While the apertures 19a, 9b, and 9c are formed by cutting circles from the common electrodes 9 corresponding to almost the centers of islands 31a to 31c, protrusions made of a dielectric material may be provided at the same positions.

The islands 31a to 31c that define each pixel electrode 31 are substantially equal in size and shape between a reflective display region R and a transmissive display region T.

As described in the fourth embodiment, the liquid crystal display device of the invention has a multigap structure, and the thickness of a liquid crystal layer 50 in the reflective display region R is smaller than in the transmissive display region T. Therefore, an alignment control force of an oblique electric field for the liquid crystal in the reflective display region R is stronger than in the transmissive display region T. As long as the apertures provided in the common electrode 9 have the same size, the aperture in the reflective display region R have an alignment control force stronger than at the apertures 9b and 9c in the transmissive display region T. Accordingly, in this embodiment, the apertures 19a smaller than the apertures 9b and 9c in the transmissive display region T are provided in the reflective display region R, thereby increasing the aperture ratio of the reflective display region R and achieving a bright reflective display while ensuring an alignment control force equivalent to that in the transmissive display region T.

This also applies to a case in which the above-described dielectric protrusions are used as the alignment control means, instead of the apertures 19a, 9b, and 9c. In this case, the size and/or height of dielectric protrusions provided in the reflective display region R is set to be smaller than the size and/or height of dielectric protrusions provided in the transmissive display region T.

Figure 9:
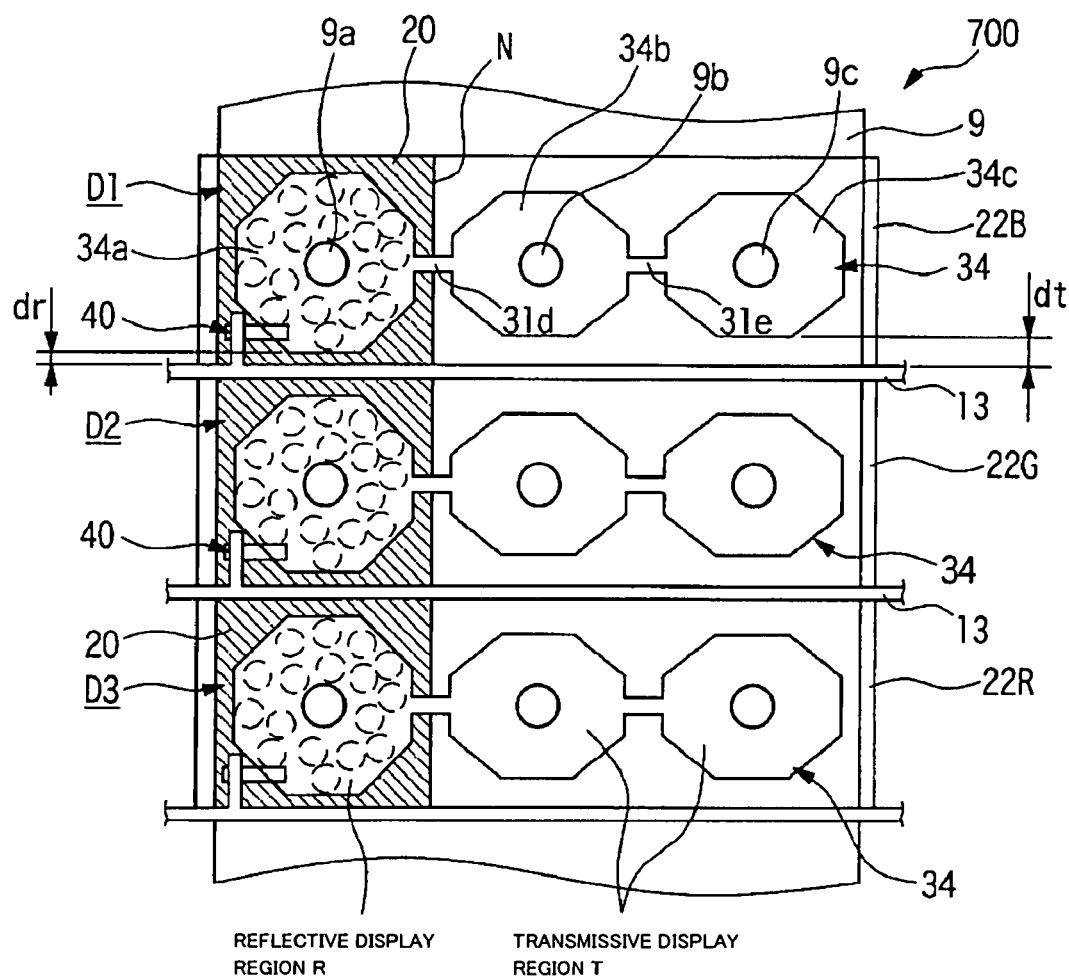
FIG. 9 is a structural plan view of a pixel region in a liquid crystal display device of a seventh embodiment.

Next, a liquid crystal display device of a seventh exemplary embodiment will be described with reference to the drawing. FIG. 9 is a view showing the planar structure of a pixel region in the liquid crystal display device of this embodiment, and corresponds to FIG. 3(a) for the first embodiment. A liquid crystal display device 700 of this embodiment is a multigap vertically-aligned transflective liquid crystal display device having a configuration similar to that of the liquid crystal display device 100 shown in FIGS. 3(*a*) and 3(*b*), except in pixel electrodes 34 having a different planar shape. Therefore, in FIG. 9, components denoted by the same reference numerals as those in FIGS. 3(*a*) and 3(*b*) are considered as similar components, and a description thereof is omitted.

As shown in FIG. 9, in the liquid crystal display device 700 of this embodiment, pixel electrodes 34 having a planar shape different from that in the liquid crystal display device 100 shown in FIG. 3(*a*) are provided in dot regions D1 to D3.

Each pixel electrode 34 is made of a transparent conductive material such as ITO, and includes, in a dot region, islands 34*a* to 34*c* arranged in the extending directions of a scanning line 13 and shaped like an octagon in plan view, and connecting portions 34*d* and 34*e* extending in the direction of the scanning line 13 to electrically connect the islands 34*a* to 34*c*. The connecting portions 34*d* and 34*e* extend from the adjoining edges of the octagonal islands 34*a* to 34*c*, thereby connecting the islands 34*a* to 34*c*. A boundary sloping area N is disposed right below the connecting portion 34*d* that connects the island 34*a* disposed in a reflective display region R and the island 34*b* disposed in a transmissive display region T.

The liquid crystal display device 700 of this embodiment is characterized in that the planar distance between a scanning line 13 extending along the long side of each of the dot regions D1 to D3, and the islands 34*a* to 34*c* differs between the reflective display region R and the transmissive display region T. That is, the distance dr between the island 34*a* in the reflective display region R and the scanning line 13 is shorter than the distance dt between the islands 34*b* and 34*c* in the transmissive display region T and the scanning line 13.

An oblique electric field is generated near a scanning line 13 (signal line) extending along the side of each of the dot regions D1 to D3, depending on the potential, and this sometimes disturbs the tilting direction of the vertically aligned liquid crystal. Therefore, it is preferable that the islands 34*a* to 34*c* in the pixel electrode 34 be disposed at a certain distance from the scanning line 13. However, when the distance between the scanning line 13 and the pixel electrode 34 is increased, the aperture ratio of the dot regions D1 to D3 decreases, and the display becomes dark.

Accordingly, in this exemplary embodiment, as described in the above fourth embodiment, the distance between the islands 34*b* and 34*c* and the scanning line 13 is long in the transmissive display region T in which the alignment control force at the edges of the islands is relatively weak because of a thick liquid crystal layer, and conversely, the distance between the island 34*a* and the scanning line 13 is small in the reflective display region R in which the liquid crystal layer is thin and an alignment control force by an oblique electric field generated at the edge of the island 34*a* is strong.

In this case, the distance between the scanning line and the island can be optimized in both the reflective region R and the transmissive region T, and the aperture ratio of the dot regions can be maximized while reducing the influence of the oblique electric field at the scanning line 13 on the display. Therefore, the liquid crystal display device 700 of this embodiment makes it possible to perform a high-quality, bright display without causing unevenness like stains and image sticking.

While the pixel-switching elements are TFDs in this embodiment, in a case in which the above-described configuration is applied to a liquid crystal display device having TFTs (thin-film transistors) as the pixel-switching elements, the islands 34*b* and 34*c* in the transmissive display region T are disposed at a longer distance from both a scanning line and a data line crossing each other than the island 34*a* in the reflective display region R.

While the pixel electrode 34 has a planar shape in which a plurality of islands 34*a* to 34*c* are connected by the connecting portions 34*d* and 34*e* in this embodiment, the positional relationship between the pixel electrode and the signal line, which characterizes this embodiment, provides the advantages, regardless of the shape of the pixel electrode. That is, in a liquid crystal display device having a substantially rectangular pixel electrode in plan view, the planar shape of the pixel electrode and the routing manner of the signal line (scanning line 13) are changed so that the planar distance between the pixel electrode in the transmissive display region T and the signal line is longer than the distance between the pixel electrode and the signal line in the reflective display region R. This also provides the operational advantages of the above embodiment, and achieves a high-quality display, in which unevenness like stains and a reduction in brightness are not caused by alignment disturbance, in both the reflective display region and the transmissive display region.

Next, a liquid crystal display device of an eighth exemplary embodiment will be described with reference to the drawing. FIG. 10 is a view showing the planar structure of a pixel region in the liquid crystal display device of this embodiment, and corresponds to FIG. 3(*a*) for the first embodiment. A liquid crystal display device 800 of this embodiment is a multigap transflective vertically aligned liquid crystal display device having a configuration similar to that of the liquid crystal display device 100 shown in FIGS. 3(*a*) and 3(*b*), except in the extending directions of a common electrode 9 and a scanning line 13 with respect to a pixel electrode. Therefore, in FIG. 10, components denoted by the same reference numerals as those in FIGS. 3(*a*) and 3(*b*) are considered as similar components, and a description thereof is omitted.

As shown in FIG. 10, each of dot regions D1 to D3 in the liquid crystal display device 800 of this embodiment has a pixel electrode 31 including a plurality of islands 31*a* to 31*c* arranged in the direction of the long side of the dot region, and connecting portions 31*d* and 31*e* for connecting the islands. A TFD 40 connected to a scanning line 130 extending in the direction of the short side of the dot region (up-down direction in the figure) is connected to the pixel electrode 31. Common electrodes 9 extending in the direction of the long sides of the dot regions D1 to D3 are arranged in stripes in plan view. Each common electrode 9 has apertures 9*a* to 9*c*, and the apertures 9*a* to 9*c* are positioned corresponding to the planar centers of the islands 31*a* to 31*c* in the pixel electrode 31.

In the liquid crystal display device 800 having the above configuration, since the scanning line 13 is disposed along the short sides of the dot regions D1 to D3, the areas in which oblique electric fields are generated near the scanning line 13 can be made narrower than the dot regions D1 to D3. Therefore, even when a sufficiently long distance is formed between the scanning line 13 and the islands 31*a* and 31*c* adjacent to the scanning line 13, the aperture ratios of the dot regions D1 to D3 are not substantially reduced, and can be made high in both the reflective display region R and the transmissive display region T. Accordingly, the liquid crystal display device 800 of this embodiment makes it possible to prevent unevenness like stains, image sticking, and the like resulting from orientation disturbance due to the scanning line 13, and to achieve a bright display.

It should be understood that the technical scope of the invention is not limited to the above-described embodiments, and various modifications are possible without departing from the scope of the invention. For example, while the insulating film 26 for the multigap structure is provided in the lower substrate 10 in the above embodiments, it may be provided on the side of the upper substrate 25 close to the liquid crystal layer 50. Furthermore, insulating films may be provided at opposing positions in the lower substrate 10 and the upper substrate 25 in order to adjust the thickness of the liquid crystal layer in the reflective display region.

While the islands 31a to 31c are electrically connected to the pixel electrodes 31 of the upper substrate 25 in the above embodiments, such a structure may be applied to the common electrodes 9. In this case, a common electrode in each dot region includes a plurality of islands electrically connected to one another, and the islands are electrically connected over a plurality of dot regions.

In the liquid crystal display devices of the above embodiments, the liquid crystal layer 50 may be composed of chiral-doped homeotropic liquid crystal. In this case, by the application of a voltage, liquid crystal domains, in which liquid crystal molecules are oriented in a radial and spiral form in plan view around the apertures 9a to 9c, are formed in the planar regions of the islands 31a to 31c. By forming such liquid crystal domains in which the liquid crystal molecules are spirally oriented, even when display is performed by causing linearly polarized light to enter the liquid crystal layer 50, the luminance rarely varies in the dot regions, and a bright display can be performed.

Figure 11:
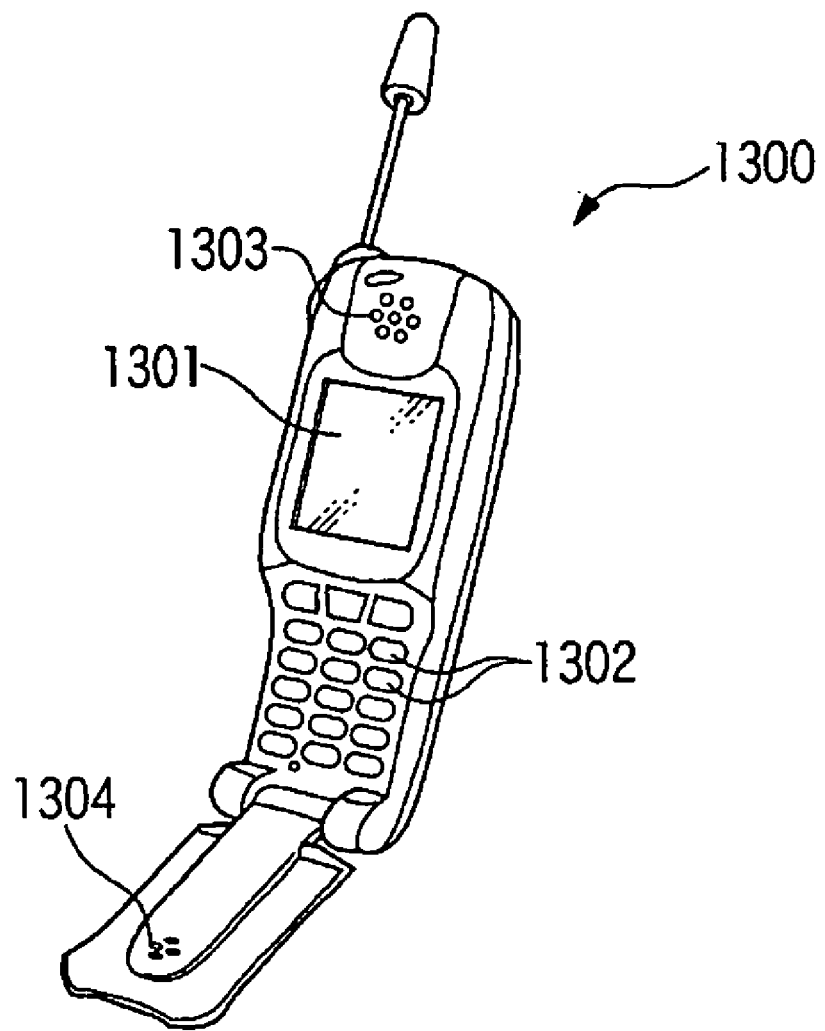
FIG. 11 is a structural perspective view of an example of an electronic apparatus according to the invention.

FIG. 11 is a perspective view of an example of an electronic apparatus according to the invention. A portable telephone 1300 shown in this figure includes a display device of the invention as a small display 1301, and also includes a plurality of control buttons 1302, an earpiece 1303, and a mouthpiece 1304.

The display devices of the above embodiments are suitably used as image display means not only in the above portable telephone, but also in, for example, an electronic book, a personal computer, a digital still camera, a liquid crystal television, a viewfinder or monitor-view video tape recorder, a car navigation system, a pager, an electronic pocketbook, an electronic desktop calculator, a word processor, a workstation, a picture telephone, a POS terminal, and a device having a touch panel. In any of the electronic apparatuses, bright, high-contrast transmissive/reflective display is possible with a wide viewing angle.

What is claimed is:

1. A liquid crystal display device, comprising:
    a pair of substrates having a dot region, the dot region having a transmittance that is uniform regardless of the alignment direction of the liquid crystal molecules;
    an electrode including, in the dot region, a plurality of islands and a connecting portion that electrically couples adjoining islands;
    a liquid crystal layer disposed between the pair of substrates, the liquid crystal layer containing liquid crystal that has a negative anisotropy;
    an alignment control device being provided in planar regions of the islands to control an alignment state of the liquid crystal when a voltage is applied; and
    a reflective film in the connecting portion.

2. A liquid crystal display device according to claim 1, the dot region including a transmissive display region for transmissive display and a reflective display region for reflective display; and
    a reflective film that scatters light being provided in the reflective display region.

3. A liquid crystal display device according to claim 2, a thickness of the liquid crystal layer differs between the transmissive display region and the reflective display region.

4. The liquid crystal display device according to claim 1, the alignment control device being provided at almost centers of the planar regions of the islands.

5. The liquid crystal display device according to claim 2, a light-scattering device that scatters reflected light being provided on a side of the substrate having the reflective film, and the light scattering device being provided in a planar region of an island disposed in the reflective display region.

6. An electronic apparatus, comprising the liquid crystal display device according to claim 1.

7. A liquid crystal display device comprising:
    a pair of substrates;
    a dot region having a transmittance that is uniform regardless of the alignment direction of the liquid crystal molecules and including a transmissive display region for transmissive display and a reflective display region for reflective display;
    an electrode including, in the dot region, a first island in the transmissive display region, a second island in the reflective display region, and a connecting portion that electrically couples the first island and the second island;
    a liquid crystal layer disposed between the pair of substrates, the liquid crystal layer containing liquid crystal that has a negative anisotropy, a thickness of the liquid crystal layer differs between the transmissive display region and the reflective display region; and
    a reflective film in the dot region except for the transmissive display region, a portion of the reflective film provided in the second island of the reflective display region scatters light, and a portion of the reflective film provided in the dot region except for the second island has a mirror-like surface.

8. A liquid crystal display device according to claim 7, the reflective film being disposed in the connecting portion.

9. A liquid crystal display device according to claim 1, the plurality of islands including a transmissive island and a reflective island, and
    the reflective film having a first portion that is provided on the dot region of the transmissive island, the first portion having mirror-like surface, and a second portion that is provided on the dot region of the reflective island, the second portion having a non-reflective surface.

10. A liquid crystal display device according to claim 7, the reflective film having a first portion that is provided on the dot region of the first island, the first portion having mirror-like surface, and a second portion that is provided on the dot region of the second island, the second portion having a non-reflective surface.

11. A liquid crystal display device according to claim 1,
    the plurality of islands including a transmissive island and a reflective island, and
    the connecting portion electrically coupling the transmissive island and the reflective island.

12. A liquid crystal display device, comprising:
    a pair of substrates having a dot region;
    an electrode including, in the dot region, a plurality of islands and a connecting portion that electrically couples adjoining islands, the connecting portion being formed narrower than the width of the islands and being formed in between the islands;
    a liquid crystal layer disposed between the pair of substrates, the liquid crystal layer containing liquid crystal that has a negative anisotropy;
    an alignment control device being provided in planar regions of the islands to control an alignment state of the liquid crystal when a voltage is applied; and
    a reflective film in the connecting portion.

13. A liquid crystal displays device comprising:
a pair of substrates;
a dot region including a transmissive display region for transmissive display and a reflective display region for reflective display;
an electrode including, in the dot region a first island in the transmissive display region, a second island in the reflective display region, and a connecting portion that electrically couples the first island and the second island, the connecting portion being formed narrower than the width of the first and second islands and being formed in between the first island and the second island;
a liquid crystal layer disposed between the pair of substrates, the liquid crystal layer containing liquid crystal that has a negative anisotropy, a thickness of the liquid crystal layer differing between the transmissive display region and the reflective display region; and
a reflective film provided in a portion of the dot region that is not the transmissive display region, wherein a portion of the reflective film that is provided in the second island, scatters light, and a portion of the reflective film that is not in the second island has a mirror-like surface.

* * * * *